United States Patent
Strauss

(10) Patent No.: US 10,423,609 B1
(45) Date of Patent: Sep. 24, 2019

(54) CONSISTENT SNAPSHOT POINTS IN A DISTRIBUTED STORAGE SERVICE

(71) Applicant: Amazon Technologies, Inc., Seattle, WA (US)

(72) Inventor: Jacob A. Strauss, Boston, MA (US)

(73) Assignee: Amazon Technologies, Inc., Seattle, WA (US)

( * ) Notice: Subject to any disclaimer, the term of this patent is extended or adjusted under 35 U.S.C. 154(b) by 239 days.

(21) Appl. No.: 15/473,377

(22) Filed: Mar. 29, 2017

(51) Int. Cl.
  G06F 16/27 (2019.01)
  G06F 16/23 (2019.01)
  G06F 11/14 (2006.01)
  G06F 16/182 (2019.01)

(52) U.S. Cl.
  CPC ...... *G06F 16/2379* (2019.01); *G06F 11/1451* (2013.01); *G06F 11/1464* (2013.01); *G06F 16/182* (2019.01); *G06F 16/27* (2019.01); G06F 2201/80 (2013.01); G06F 2201/84 (2013.01)

(58) Field of Classification Search
  None
  See application file for complete search history.

(56) References Cited

U.S. PATENT DOCUMENTS

| | | | | |
|---|---|---|---|---|
| 5,701,480 A * | 12/1997 | Raz | ........................ | G06F 9/466 714/19 |
| 7,290,056 B1 * | 10/2007 | McLaughlin, Jr. | ........................ | H04L 43/0852 709/201 |
| 7,779,295 B1 * | 8/2010 | Shah | .................... | G06F 11/1458 714/13 |
| 7,827,350 B1 * | 11/2010 | Jiang | .................... | G06F 11/1469 707/639 |
| 2005/0065986 A1 * | 3/2005 | Bixby | .................... | G06F 16/128 |
| 2011/0153797 A1 * | 6/2011 | Danilov | .................. | G06F 9/466 709/223 |
| 2011/0246423 A1 * | 10/2011 | Jess | ..................... | G06F 11/1466 707/639 |
| 2012/0101991 A1 * | 4/2012 | Srivas | ............... | G06F 17/30194 707/623 |
| 2012/0102006 A1 * | 4/2012 | Larson | .............. | G06F 17/30575 707/703 |
| 2012/0303581 A1 * | 11/2012 | Calder | .................... | G06F 16/27 707/626 |
| 2013/0124475 A1 * | 5/2013 | Hildenbrand | ..... | G06F 17/30351 707/636 |

(Continued)

*Primary Examiner* — Polina G Peach

(74) *Attorney, Agent, or Firm* — Robert C. Kowert; Meyertons, Hood, Kivlin, Kowert & Goetzel, P.C.

(57) ABSTRACT

Methods and apparatus for identifying consistent snapshot points for file systems in a distributed storage service in which a client may access a file system in backend storage via two or more access nodes. A snapshot coordinator initiates a two-phase commit to perform a snapshot epoch transition. The coordinator sends prepare messages to the nodes. In response, a node sends a response to the coordinator, stops issuing writes to the file system, sets a timer, and waits for a commit message. Upon receiving a response from all nodes, the coordinator sends a commit message. Upon receiving the commit or the timer expiring, the nodes increment an epoch counter and begin issuing writes to the file system tagged with the new epoch and indicating that a copy-on-write operation be performed. The transition is successful if all nodes respond to the request message; otherwise, the two-phase commit is retried.

20 Claims, 24 Drawing Sheets

(56) References Cited

U.S. PATENT DOCUMENTS

2016/0371356 A1* 12/2016 Lee .................... G06F 16/2379
2017/0177698 A1*  6/2017 Lee .................. G06F 17/30477

* cited by examiner

CONSISTENT SNAPSHOT POINTS IN A DISTRIBUTED STORAGE SERVICE

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

Some large provider networks implement a variety of storage services, such as services that implement block-level devices (volumes) or objects that can be modeled as arbitrary bit buckets accessible via respective URLs (uniform resource locators). However, a number of applications running at data centers of a provider network may still face limitations with respect to their use of some of the more common storage-related programmatic interfaces, such as various industry-standard file system interfaces. Some industry-standard file systems may have been designed prior to the large-scale deployment of network-accessible services, and may therefore support consistency models and other semantics that are not straightforward to implement in distributed systems in which asynchronous interactions, failures of individual components and network partitions or networking-related delays are all relatively common.

Figure 1:
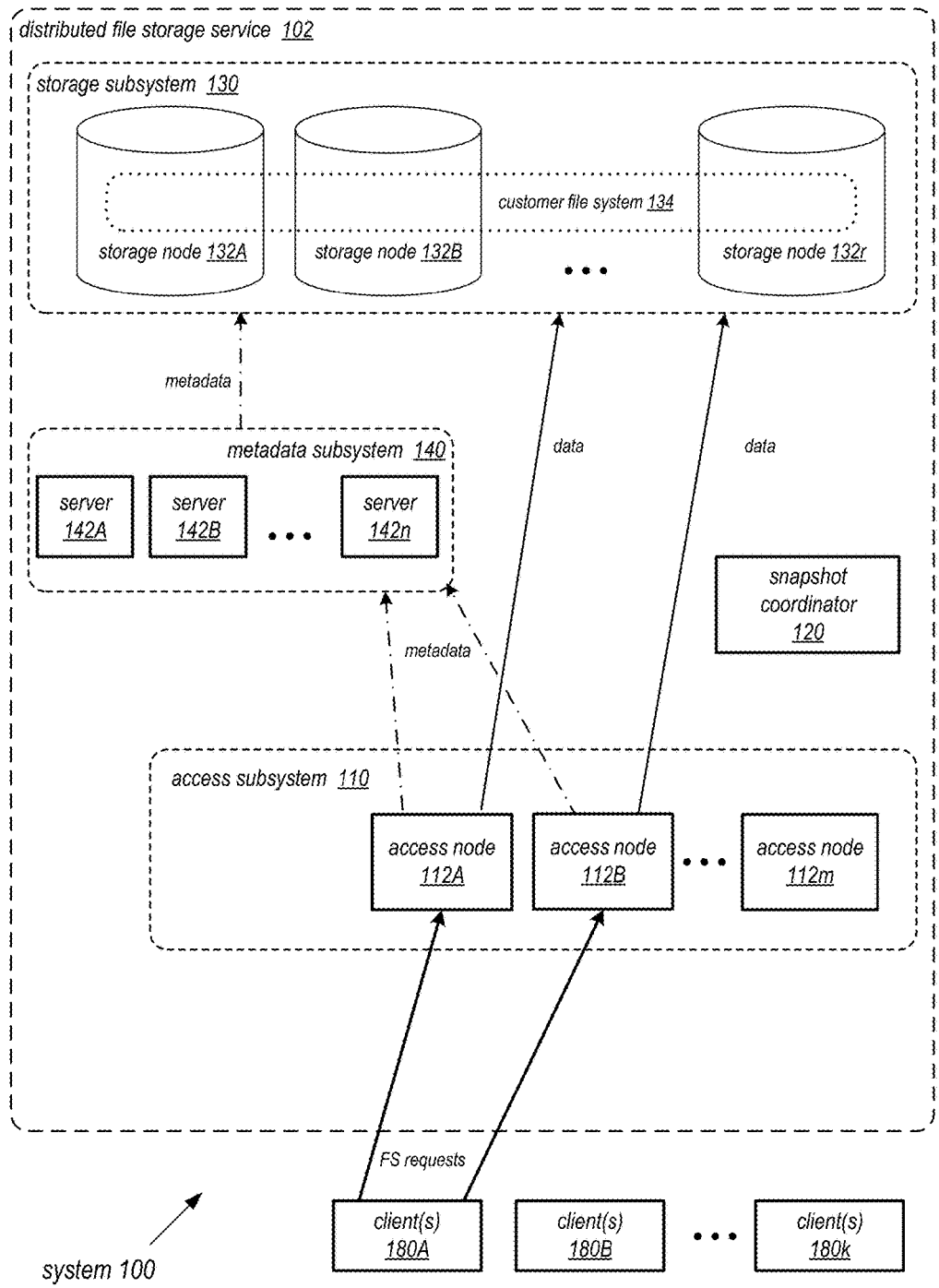
FIG. 1 provides a high-level overview of a distributed file storage service (DFSS) that includes a snapshot coordinator, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for providing consistent snapshot points in a distributed storage service are described. Embodiments of methods are described for identifying consistent snapshot points for customers' data systems (e.g., file systems) in a distributed storage service in which clients may access the data systems in backend storage via two or more access nodes. The methods may be implemented by a snapshot coordinator and the access nodes in an access subsystem of the distributed storage service that resides between distributed storage service client instances and backend storage implemented by a storage subsystem of the distributed storage service, for example a block-based backend storage subsystem (BSS). In at least some embodiments, a snapshot coordinator initiates a two-phase commit to perform a snapshot epoch transition for a given data system. In the two-phase commit, the snapshot coordinator sends prepare messages to the access nodes that are assigned to the data system. In response to receiving a prepare message, an access node sends a response to the snapshot coordinator, stops issuing writes to the file system, sets a timer, and waits for a commit message. Upon receiving a response from all access nodes that are assigned to the data system, the snapshot coordinator sends a commit message to the access nodes. Upon receiving the commit message or the timer expiring, the access nodes increment an epoch counter and begin issuing writes to the backend storage tagged with the new epoch and indicating that a copy-on-write operation be performed. The transition is successful if all nodes respond to the request message; otherwise, the two-phase commit may be retried.

As used herein, "customer" generally refers to an entity that owns or controls a data system (e.g., a file system) maintained by the distributed storage service. "Client" or "client instance" generally refers to a computer system/application instance that has access to a customer's data system (e.g., file system) maintained by the distributed storage service. "Data system" as used herein broadly refers to any collection of data objects (e.g., file systems comprising files, directories, metadata (e.g., inodes), etc.; databases comprising records, tables, metadata, etc.) that may be stored in the backend storage subsystem and accessed through the access subsystem of the distributed storage service.

In some embodiments the distributed storage service may be implemented using resources of a provider network, and may be used for data-related (e.g., file system-related) operations by multiple different applications or clients running at compute instances of the provider network. FIGS. 14 through 17 and the section titled Example provider network environment illustrate an example provider network environment in which embodiments may be implemented, according to some embodiments.

An example multi-tenant distributed file storage service (DFSS) is described in which embodiments of the consistent snapshot point methods and apparatus may be implemented. Details of the example DFSS are illustrated in FIGS. 10 through 13 and described in the section titled Distributed File Storage Service. In some embodiments, the DFSS provides a file service (e.g., a network file system (NFS) v4.0 service, or other file system technology services) to clients running on customers' client instances, for example in a provider network environment. The DFSS stores data and metadata for each customer's file system(s) in a file store on a backend storage subsystem (BSS). Broadly defined, data is the content of the files in a customer's file system, and metadata is information about the files, directories, and other structures of the file system. Data operations on the file system may include any update to the content of a file or files in the file system, for example reads, writes, appends, and deletes. Metadata operations on the file system may include any operation that affects the structures of the file system, for example creating, deleting, moving, or renaming files or directories, and truncate and append operations on files.

In some embodiments, the DFSS distributes each file system's data and metadata over blocks of data stored in a large set of replicated state machines (an extent is a single instance of a replicated state machine). Each storage node in the backend storage subsystem (BSS) of the DFSS may participate in multiple extents. No single storage node in the BSS knows the state of an entire file system in the DFSS, or even the entire state of a file or directory. In some embodiments, metadata operations which atomically modify multiple blocks (e.g., creating a file edits both the new file and its containing directory) use distributed transaction chains based on a two-phase commit.

A customer's client instances communicate with a set of front end servers (referred to as hubs or access nodes) in an access subsystem of the DFSS. The access nodes serve as file system (e.g., NFS) protocol endpoints, and issue data and metadata requests to the BSS. The access nodes provide the appearance of a single server even though there are multiple active access nodes for each file system, and a client may be switched between access nodes based on server-side load decisions. File system operations against a set of access nodes are fully consistent: metadata operations that are serializable across the entire file system, as is each page component (e.g., 32 KB or less) of larger read and write operations. Applications using DFSS see the expected close-to-open semantics, or read-after-write for applications which eschew file system client caches. Close-to-open cache consistency guarantees that when a file is closed, subsequent opens will see the latest changes to the file. Read-after-write consistency guarantees that new file system objects and data added to a file system are immediately visible to clients of the file system. In some embodiments, client instances running in different availability zones can each use and modify a DFSS file system through access node(s) in their local availability zones, and failures in one availability zone do not prevent other availability zones from continuing all operations normally.

Customers of a distributed storage service such as DFSS may want to capture snapshots of their data systems (e.g., file systems) for various reasons. For example, a customer may want to create one or more backup copies of their file system to guard against accidental edits and deletions. As another example, a customer may want to clone a file system one or more times to use as a template for other actions.

In some cases, it might be sufficient to walk a customer's file system directory structure and create a copy of each directory and file without regard to what other operations are in progress. However, in other cases, there may be a need for capturing consistent snapshots of a customer's data. For example, in use cases where there are internal dependencies between modifications (e.g., a database stored atop DFSS) may require a consistent snapshot. A consistent snapshot contains the effects of all modifications (e.g., write operations) up to some point in time and nothing from any later modification. For example, all modifications m to a file system may be ordered by time, and the timeline of the file system with a snapshot S at time t can be described as follows:

$\{m_0, m_1, m_2, \ldots, m_{t-2}, m_{t-1}\} \; S_t \; \{m_{t+1}, m_{t+2}, \ldots\}$ If any operation contains multiple sub-parts, then the snapshot $S_t$ must contain all components of modification $m_{t-1}$ and none of modification $m_{t+1}$'s component steps.

However, since a distributed storage service such as DFSS uses multiple active access nodes for read and write operations to each customer's data system (e.g., file system) in the BSS, conventionally, there is no single entity that can classify operations by whether they occur before or after a snapshot point. Because file system requests to the BSS originate from multiple access nodes, and non-conflicting file system operations may execute in parallel, the serialization order cannot be discovered. To overcome this problem with conventional distributed storage services, embodiments of methods for identifying consistent snapshot points for file systems in a distributed storage service are described that inject a single linearization point (referred to as a snapshot point) into data (e.g., a file system) stored in the BSS of the distributed storage service (e.g., DFSS).

In embodiments, a snapshot coordinator, for example implemented as a set of processes or threads executing at one or more physical or virtualized servers, in response to a snapshot request for a customer's data system (e.g., file system), may initiate a two-phase commit across all access nodes that might modify the data system (e.g., file system) to identify a consistent commit point across all of the access nodes. A commit point (also referred to as a snapshot point) identifies a single point in time across all the client-facing data (e.g., file system) operations. Customer data (e.g., file system) operations are paused at the access nodes only while the two-phase commit is in progress. In some embodiments, the two-phase commit either succeeds to label a snapshot (i.e., succeeds in identifying a snapshot point across all access nodes that modify the data (e.g., file system)), or fails, for example because not all of the access nodes reply in a timely manner. In some embodiments, failed attempts may be retried until a consistent snapshot point is successfully identified.

In some embodiments, snapshot points may delineate snapshot epochs. Referring to the timeline of a file system with a snapshot S at time t:

$\{m_0, m_1, m_2, \ldots, m_{t-2}, m_{t-1}\}$ $S_t$ $\{m_{t+1}, m_{t+2}, \ldots\}$ operations $\{m_0, m_1, m_2, \ldots, m_{t-2}, m_{t-1}\}$ are in a first (or previous) epoch, $S_t$ identifies a snapshot point, and operations $\{m_{t+1}, m_{t+2}, \ldots\}$ are in a second (new, or current) epoch. To identify a snapshot point, the access nodes, during the two-phase commit, may increment an epoch number, with the previous epoch number identifying the previous snapshot epoch, and the new epoch number identifying the new snapshot epoch. Prior to the two-phase commit, all data and metadata write operations for the file system sent to the BSS by the access nodes include the previous epoch number (as an epoch tag), and the BSS tags all metadata and data items that are updated (e.g., blocks, inodes, etc.) with the previous epoch number. During the two-phase commit, once write operations to the file system resume, all data and metadata write operations for the file system sent to the BSS by the access nodes include the new epoch number, and the BSS tags all metadata and data items that are updated (e.g., blocks, inodes, etc.) with the new epoch number. In some embodiments, the access nodes also set a preserve flag in the data and metadata write operations directing the BSS to perform copy-on-write for the file system so that the previous epoch data and metadata is preserved.

In some embodiments, after a snapshot point is successfully identified across all the access nodes that modify the file system, the BSS duplicates any new writes received from the access nodes in a copy-on-write fashion while a background process walks the file system to copy the snapshot view of the file system identified by the previous epoch number elsewhere (e.g., to storage provided by another storage service of a provider network). After the background process completes, a message is sent to the access nodes for the file system indicating that the snapshot is complete; in response, the access nodes reset the preserve flag in the write operations, which effectively stops the BSS from performing copy-on-write operations for the file system from that point forward.

While embodiments of methods and apparatus for identifying consistent snapshot points for data systems stored in a distributed storage service are generally described in reference to an example DFSS that stores customers' file systems, embodiments may also be applied in distributed storage services that store other types of customer data systems, for example databases.

FIG. 1 provides a high-level overview of a distributed file storage service (DFSS) that includes a snapshot coordinator 120, according to some embodiments. As shown, a system 100 may include a DFSS 102 that may be logically divided into subsystems. For example, a DFSS 102 may include a storage subsystem 130, an access subsystem 110, and a metadata subsystem 140. Each subsystem may include a plurality of nodes or servers, such as storage nodes 132A . . . 132r of storage subsystem 130, access nodes 112A . . . 112m of access subsystem 110, and servers 142A . . . 142n of metadata subsystem 140. Each node may, for example, be implemented as a set of processes or threads executing at a respective physical or virtualized server in some embodiments. The number of nodes or servers in any given subsystem may be modified independently of the number of nodes or servers in the other subsystems in at least some embodiments, thus allowing deployment of additional resources as needed at any of the subsystems (as well as similarly independent reduction of resources at any of the subsystems). The term "server" may be used herein as an equivalent of the term "node".

In at least some embodiments, the storage nodes 132 may store extents, for example using some combination of solid state drives (SSDs) and rotating disks. An extent, which may for example include some number of gigabytes of (typically but not always) contiguous storage space at some set of physical storage devices, may represent a unit of storage replication. Thus, a number of physical replicas of any given logical extent may be stored. Each extent replica may be organized as a number of physical pages, with the pages representing the smallest units in which reads or writes are implemented within the DFSS 102. As discussed below with respect to FIG. 12, a given file store object (e.g., a file or a metadata structure) may be organized as a set of logical blocks, and each logical block may be mapped to a set of pages within a data extent. Metadata for the file store object may itself include a set of logical blocks (potentially of different sizes than the corresponding logical blocks for data), and may be stored in pages of a different extent. In some embodiments, replicated state machines may be used to manage updates to extent replicas.

The access subsystem 110 may present one or more file system interfaces to each customer's clients 180, such as file system APIs (application programming interfaces). In at least some embodiments, a set of load balancers (e.g., software or hardware devices that may be configured independently of the DFSS 102 itself) may serve as intermediaries between clients 180A-180k of the DFSS 102 and the access subsystem 110. In some cases, at least some aspects of load balancing functionality may be implemented within the access subsystem 110 itself. In at least some embodiments the access nodes 112A-112m may represent service endpoints established within the appropriate network fabric that is concurrently being used by clients 180A-180k. In some embodiments, special network addresses associated with isolated virtual networks may be assigned to access nodes 112A-112m. In some embodiments, access nodes 112A-112m may authenticate an incoming client connection, e.g., based on the client's network identity as well as user identity. In some cases, access nodes 112A-112m may interact with identity/authentication services similar to Active Directory Service or Kerberos. Some file system protocols that may be supported by the distributed file storage service 102 (such as NFSv4 and SMB2.1) may require a file server to maintain state, for example pertaining to locks and opened file identifiers. In some embodiments, durable server state, including locks and open file states, may be handled by the metadata servers 142 for file systems rather than the access subsystem 110, and as a result the access subsystem 110 may be considered a largely stateless server fleet that can be scaled up and down as needed.

In some embodiments, client 180 FS requests proceed to a DFSS access node 112. The access node 112 sends all metadata requests to one or more metadata servers 142 for a respective file system. The access node 112 sends data read and write requests for the respective file system directly to the BSS 130. However, in some embodiments, access nodes 112A-112m may cache metadata state pertaining to various file store objects, and may use the cached metadata to submit at least some internal I/O requests directly to storage nodes 132A-132n without requiring interactions with metadata subsystem 140.

For example, as illustrated in FIG. 1, a customer file system 134 is accessed by client(s) 180A. Access nodes 112A and 112B of metadata subsystem 140 have been assigned to handle requests for file system 134. While two access nodes 112 are used by way of example and for simplicity, any number of the fleet of access nodes 112A-112m in access subsystem 210 may be assigned to file system 134. FS requests from client(s) 180A are sent to access node 112A or 112B of access subsystem 110. The access node 112A or 112B sends metadata requests for the file system 134 to one or more servers 142 that have been designated as the metadata server(s) 142 for that file system 134 (e.g., server 134A); the server 142 handles the metadata requests. Data read and write requests for the file system 134 are sent by the access node 112A or 112B to respective extent(s) in the BSS 130.

The DFSS 102 may also include at least one snapshot coordinator 120, for example implemented as a set of processes or threads executing at one or more physical or virtualized servers. In some embodiments, there may be one snapshot coordinator 120 for each file system. In some embodiments, a snapshot coordinator 120 may handle snapshot operations for two or more file systems. In some embodiments, the DFSS 102 may include a pool or layer of two or more snapshot coordinators 120, and snapshot operations for a particular file system may be switched to another snapshot coordinator 120 upon failure of a snapshot coordinator 120 that is currently assigned to the file system. Operations of the snapshot coordinator 120 are further described with respect to FIGS. 2A through 2G. In some embodiments, snapshot coordinator(s) 120 may, for example, be implemented logically between access nodes 110 and storage subsystem 130 on a control plane of a provider network as illustrated in FIGS. 14 through 17.

Figure 2A:
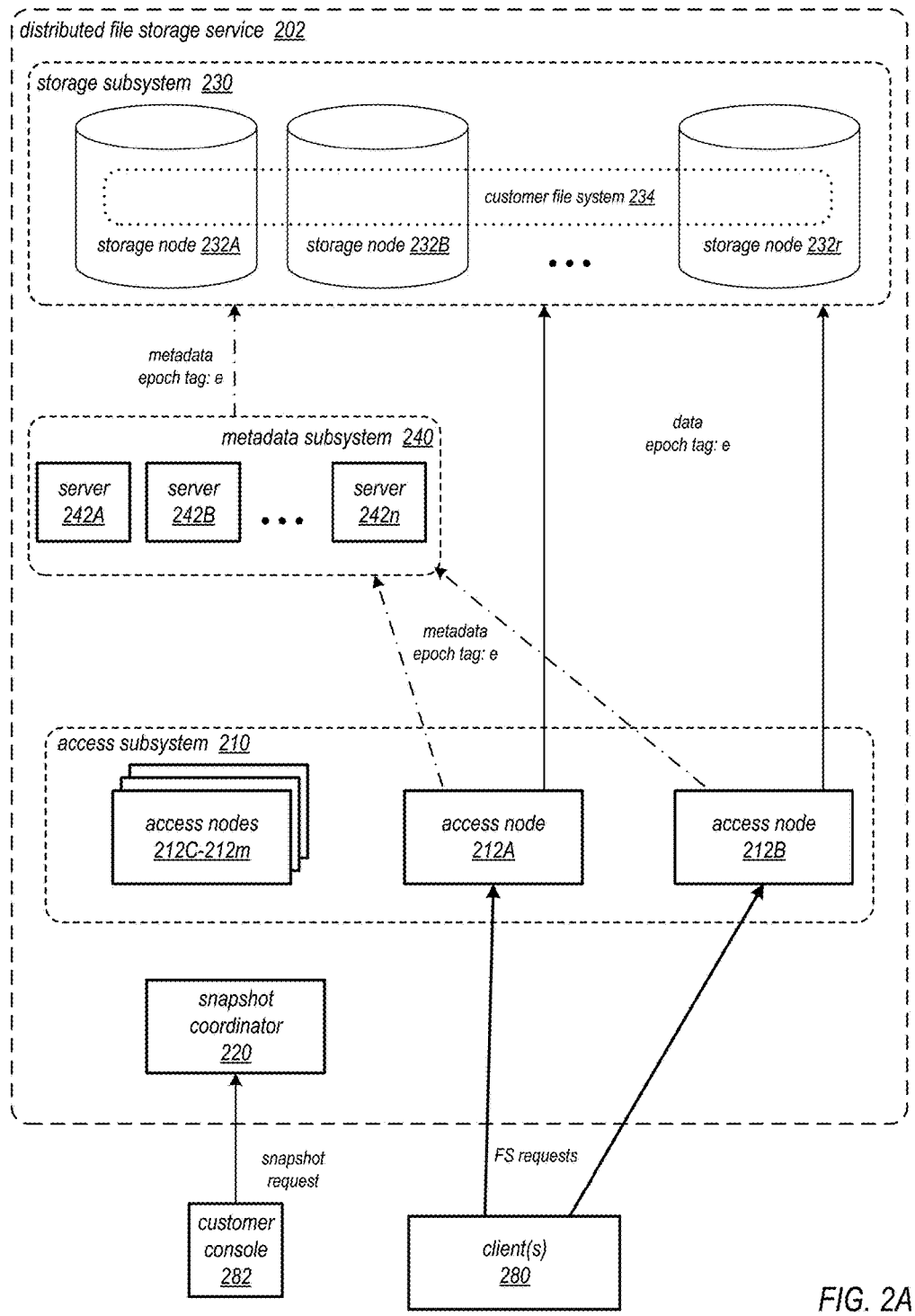
FIGS. 2A through 2E illustrate a two-phase commit process for performing a snapshot epoch transition for a file system (FS) in a DFSS as illustrated in FIG. 1, according to some embodiments.

FIGS. 2A through 2E illustrate a two-phase commit process for performing a snapshot epoch transition for a file system (FS) in a DFSS as illustrated in FIG. 1, according to some embodiments. In FIG. 2A, client(s) 280 may generate FS requests to the DFSS 202 for a customer's file system 234; the FS requests for file system 234 are forwarded or distributed to two or more access nodes 212 that are in the set of access nodes currently assigned to the file system 234 in the fleet of access nodes 212A-212m of access subsystem 210. In this example, for simplicity of illustration, the set includes two access nodes 212A and 212B, but there may be any number of access nodes 212 in the set. The access nodes 212A and 212B send metadata operations to a server 242 in metadata subsystem 240 that is assigned to the file system 234; the metadata server 242 processes (e.g., serializes) the metadata operations and sends the metadata operations to the backend storage subsystem 230 to update (or read) file system 234 metadata. The access nodes 212A and 212B process and send data operations (reads and writes) directly to the backend storage subsystem 230 to update (or read) file system 234 data. The access nodes 234A and 234B maintain an epoch number (currently at the value e) identifying the current snapshot epoch of the file system 234. The metadata and data write operations are tagged with the epoch number e. The backend storage subsystem 230 tags all metadata and data items that are updated in response to the metadata and data write operations (e.g., blocks, inodes, etc.) with the epoch number e. FIG. 3B illustrates a data or metadata item tagged with an epoch number.

Figure 3A:
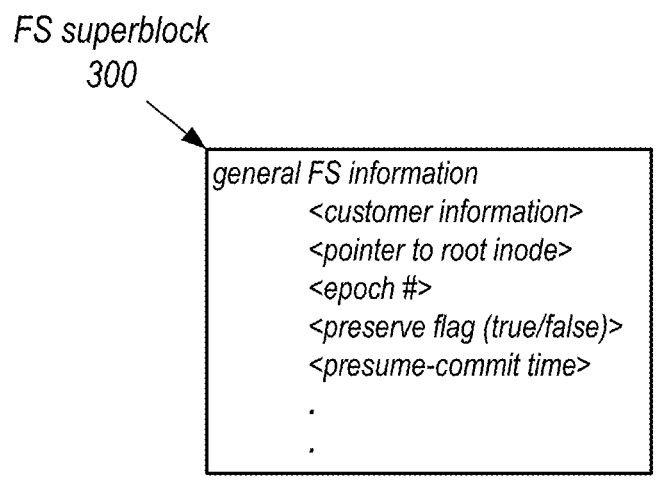
FIGS. 3A and 3B illustrate FS data structures, according to some embodiments.

In some embodiments, access nodes 212 may be added to or removed from the set of access nodes assigned to a file system 234; newly added access nodes 212 need to discover the current state of the file system 234 that they have been assigned to, including but not limited to the current epoch of the file system 234. In addition, an access node 212 currently in the set assigned to the file system 234 may go down or lose network connectivity for a time, and thus may need to recover the state of the file system 234, including but not limited to the current epoch of the file system 234. In some embodiments, each file system in the DFSS 202 may have an associated persistent data structure (referred to as a superblock) that may include information about the file system, for example where the file system's inodes are (e.g., a pointer to a root inode), information about the customer that owns the file system, and so on, for example as shown in FIG. 3A. In some embodiments, the superblock 300 may include an epoch number field that is updated by the backend storage subsystem 230. In some embodiments the superblock 300 may also include a preserve flag field that indicates whether the file system is currently in copy-on-write mode during a snapshot generation process. In some embodiments the superblock 300 may also include a presume-commit time field that indicates how long an access node 212 should wait for a commit message from the snapshot coordinator 220 before presuming commitment to a new snapshot epoch. Upon being assigned to a file system (or recovering from a failure while assigned to a file system), an access node 212 may read the superblock to obtain information about the file system including but not limited to the current epoch number and the preserve flag for the file system.

Figure 9:
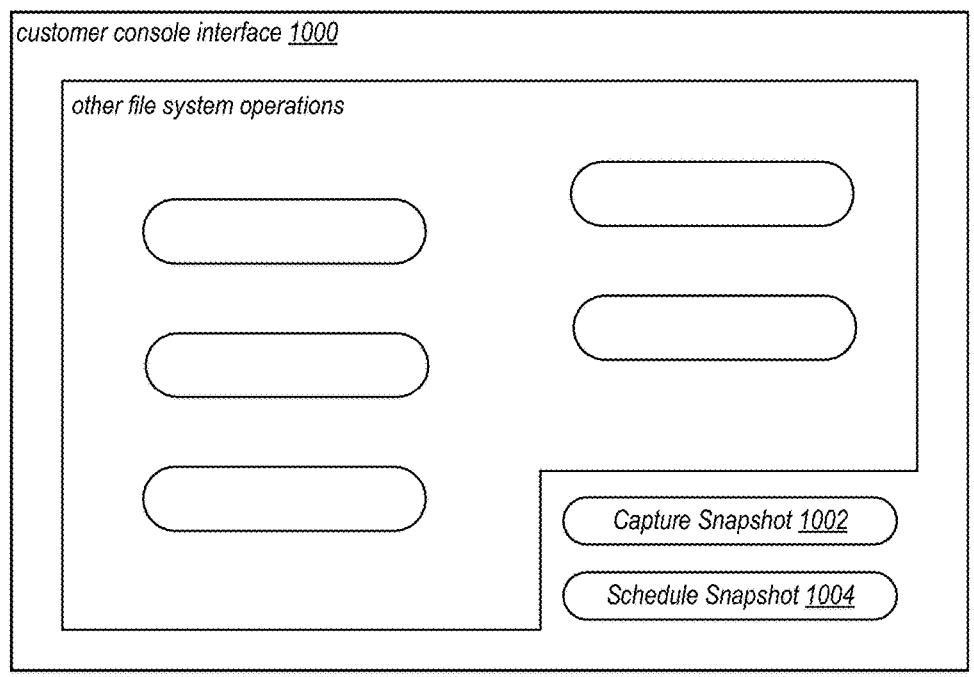
FIG. 9 illustrates an example customer console user interface, according to some embodiments.

Referring again to FIG. 2A, snapshot coordinator 220 of the DFSS 202, for example implemented as a set of processes or threads executing at one or more physical or virtualized servers, may receive a snapshot request for the file system 234 of a customer. For example, a request to perform a snapshot request may be generated by selecting a capture snapshot user interface element 1002 of a user interface 1000 displayed on a customer console 282 as illustrated in FIG. 9. As another example, the customer may schedule in advance one-time or periodic snapshots for their file system 234 via a user interface element 1004 of a user interface 1000 displayed on a customer console 282 as illustrated in FIG. 9.

Figure 2B:
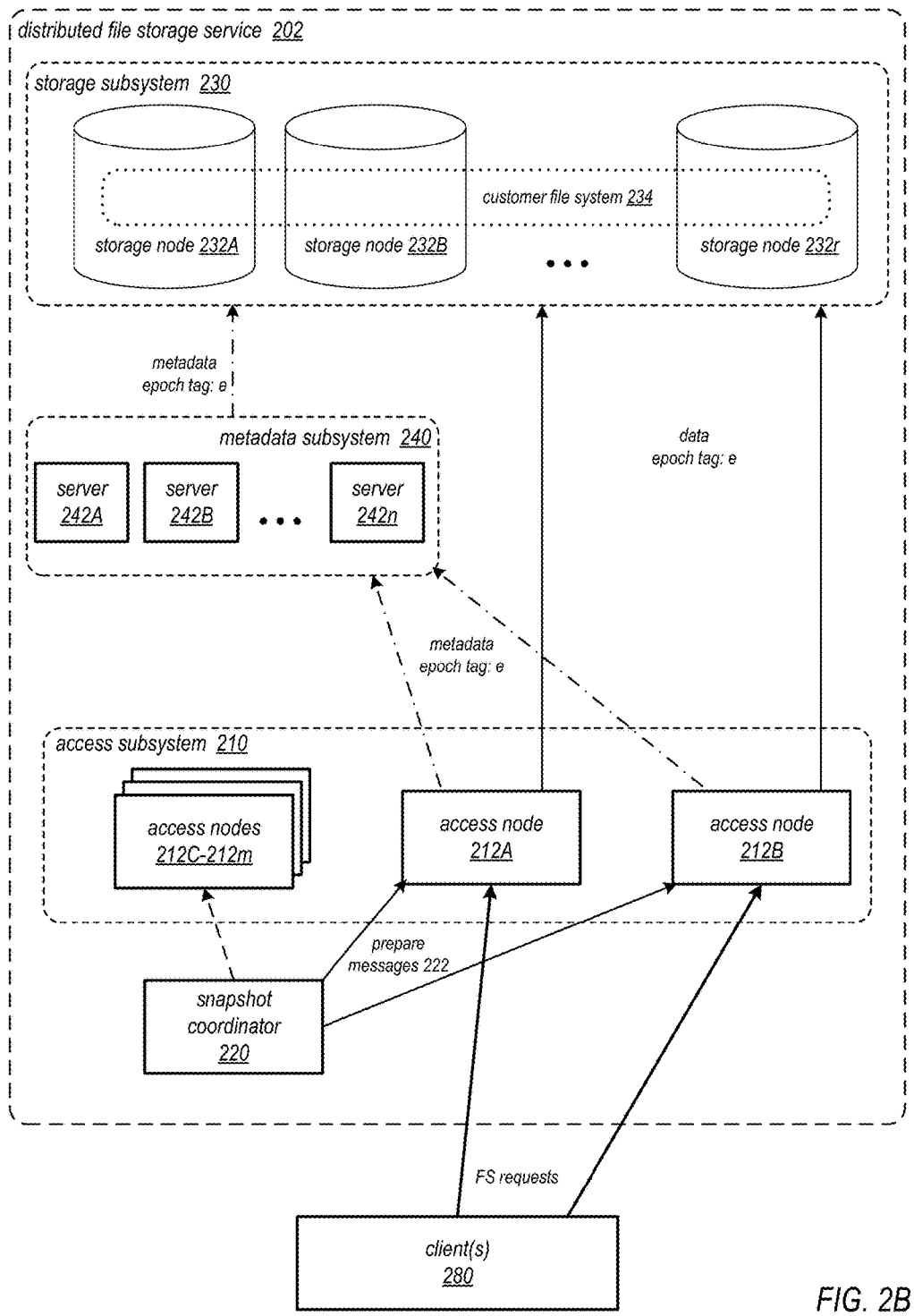
Figure 3B:
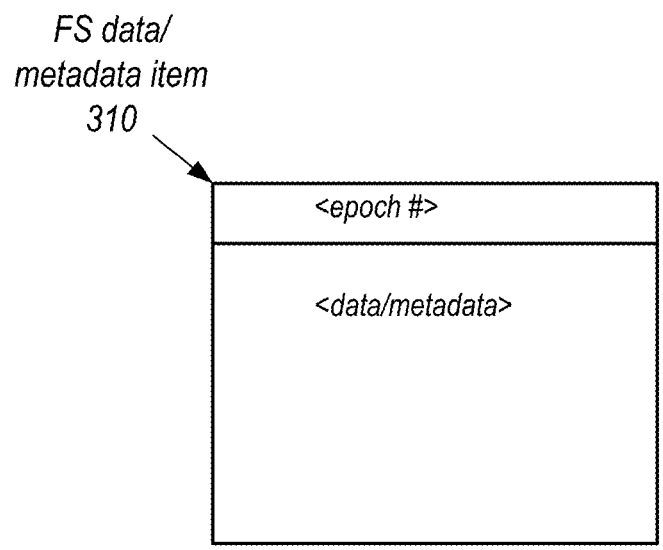

In FIG. 2B, access nodes 212A and 212B are still receiving and processing FS requests for file system 234 from clients 280 in epoch e. In response to the snapshot request for file system 234, the snapshot coordinator 220 sends prepare messages 222 to each of the access nodes 212 that are assigned to the file system 234 (in this example, access nodes 212A and 212B). In some embodiments, the snapshot coordinator 220 sends the prepare messages 222 only to the access nodes 212 that are assigned to the file system 234. However, since the set of access nodes 212 that are assigned to the file system 234 may change, in some embodiments the snapshot coordinator 220 may send prepare messages 222 to all access nodes 212A-212m in the fleet.

Figure 2C:
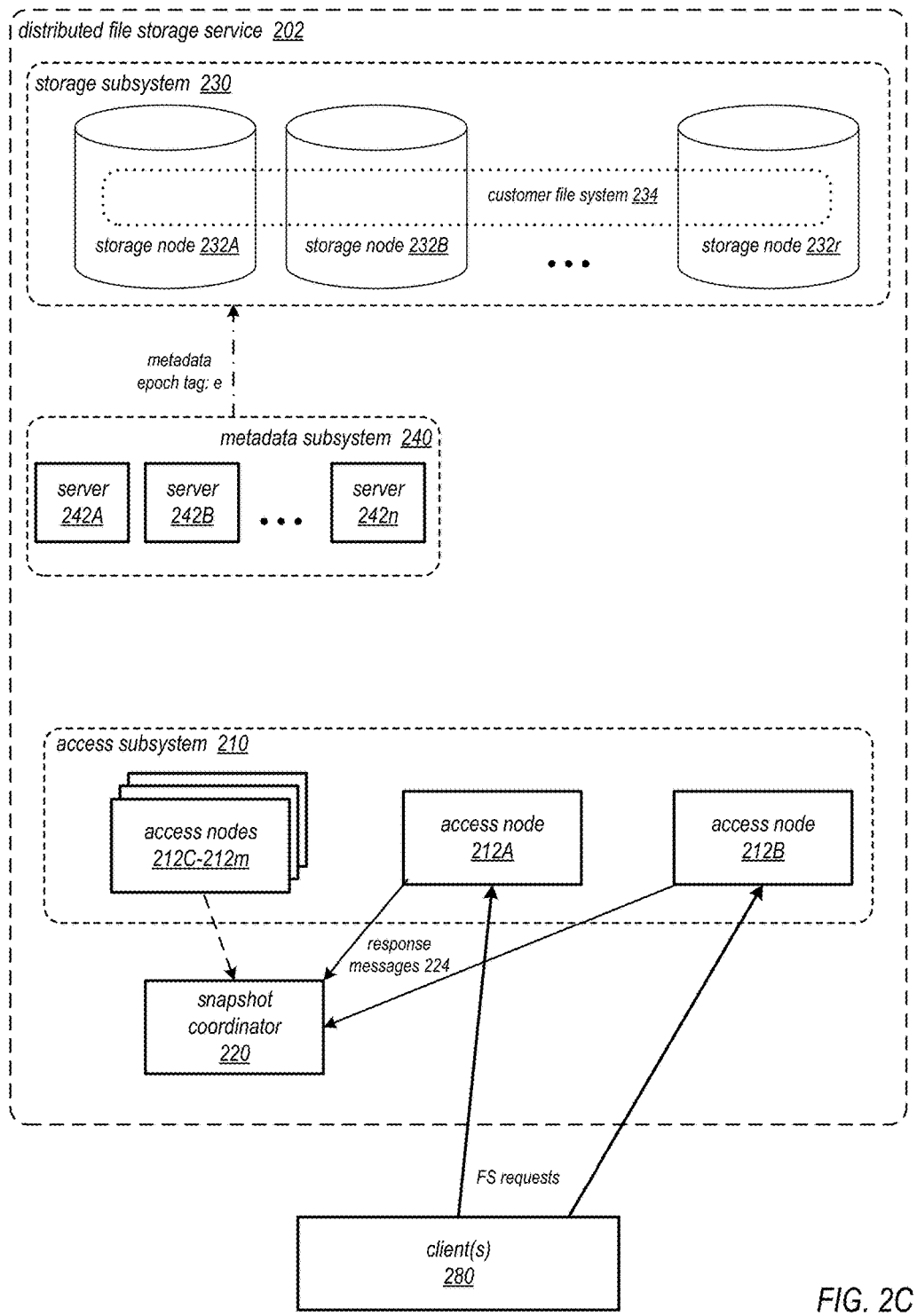

In FIG. 2C, in response to the prepare message 222, access nodes 212A and 212B may still receive new FS requests from clients 280; the new FS requests may be queued, but the access nodes 212A-212B temporarily suspend processing of new FS requests, and the access nodes 212A-212B thus do not send metadata and data write operations to the metadata subsystem 240 and backend storage subsystem 230 to fulfill the new FS requests. Any pending metadata and data write operations from previous FS requests may still be sent to the metadata subsystem 240 and backend storage subsystem 230 to complete operations in the current epoch e. In some embodiments, the access nodes 212A-212B may stop issuing new read requests to the metadata subsystem 240 and backend storage subsystem 230 as well as new write requests. However, in some embodiments, the access nodes 212A-212B may continue to issue new read requests to the metadata subsystem 240 and backend storage subsystem 230 while new write requests are suspended. The storage subsystem 230 may continue to send responses to any pending read or write operations to access nodes 212A and 212B. The access nodes 212A and 212B send response messages 224 to the snapshot coordinator 220 to indicate that they are ready to commit to a new snapshot epoch. In some embodiments, after suspending write operations to the backend storage subsystem 230 and before sending a response message 224 to the snapshot coordinator 220, an access node 212 waits for any pending write operations to the backend storage subsystem 230 to complete. The access nodes 212A and 212B may also set a presume-commit timer indicating a time period to wait (e.g., for 100 ms) for a commit message from the snapshot coordinator 220 before assuming commitment to a new snapshot epoch. The time period may, for example, be estimated based on how long it typically takes to drain any pending write operations.

In embodiments where the snapshot coordinator 220 sends prepare messages 222 to all access nodes 212A-212m in the fleet, access nodes 212 that are not in the set of access nodes 212 assigned to the file system 234 may respond to the snapshot coordinator 220 to indicate that they are not assigned to the file system 234.

Figure 2D:
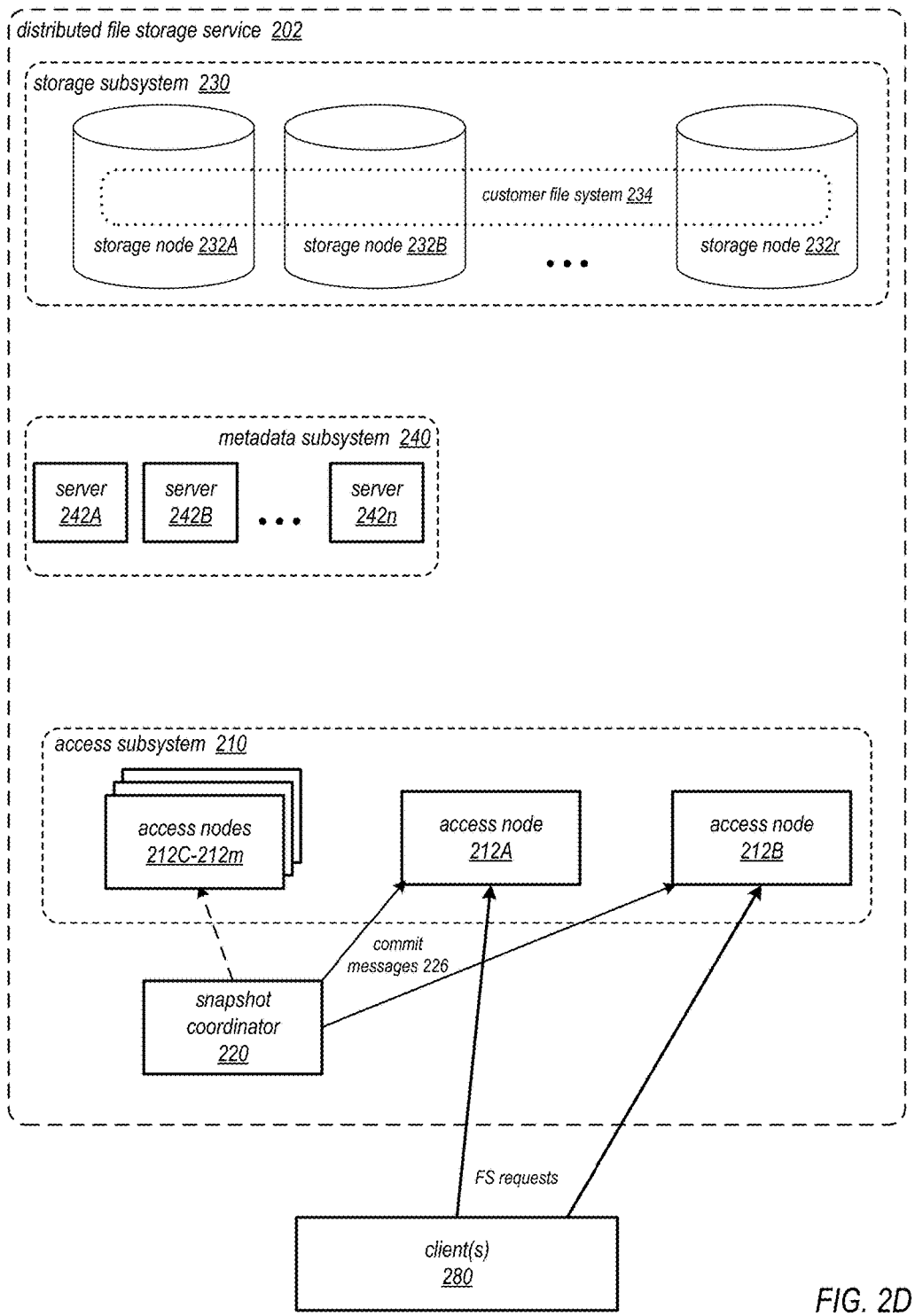

In FIG. 2D, upon receiving responses 222 from all access nodes 212 that are in the set of access nodes 212 assigned to the file system 234 (access nodes 212A and 212B, in this example), snapshot coordinator 220 sends commit messages 226 to nodes 212A and 212B. In some embodiments, a time period for receiving the responses 222 may be designated, for example based on the presumed-commit time used for the timers at the access nodes 212A and 212B. If the snapshot coordinator 220 receives response messages 224 from all of the access nodes 212 that are assigned to the file system 234 within the designated time period, then the commit messages 226 are sent. In some embodiments the snapshot coordinator 220 may send commit messages 226 to all access nodes 212A-212m in the fleet; access nodes 212 that are not currently assigned to file system 234 may simply ignore the messages 226, or may respond indicating that they are not assigned to the file system 234.

Figure 2E:
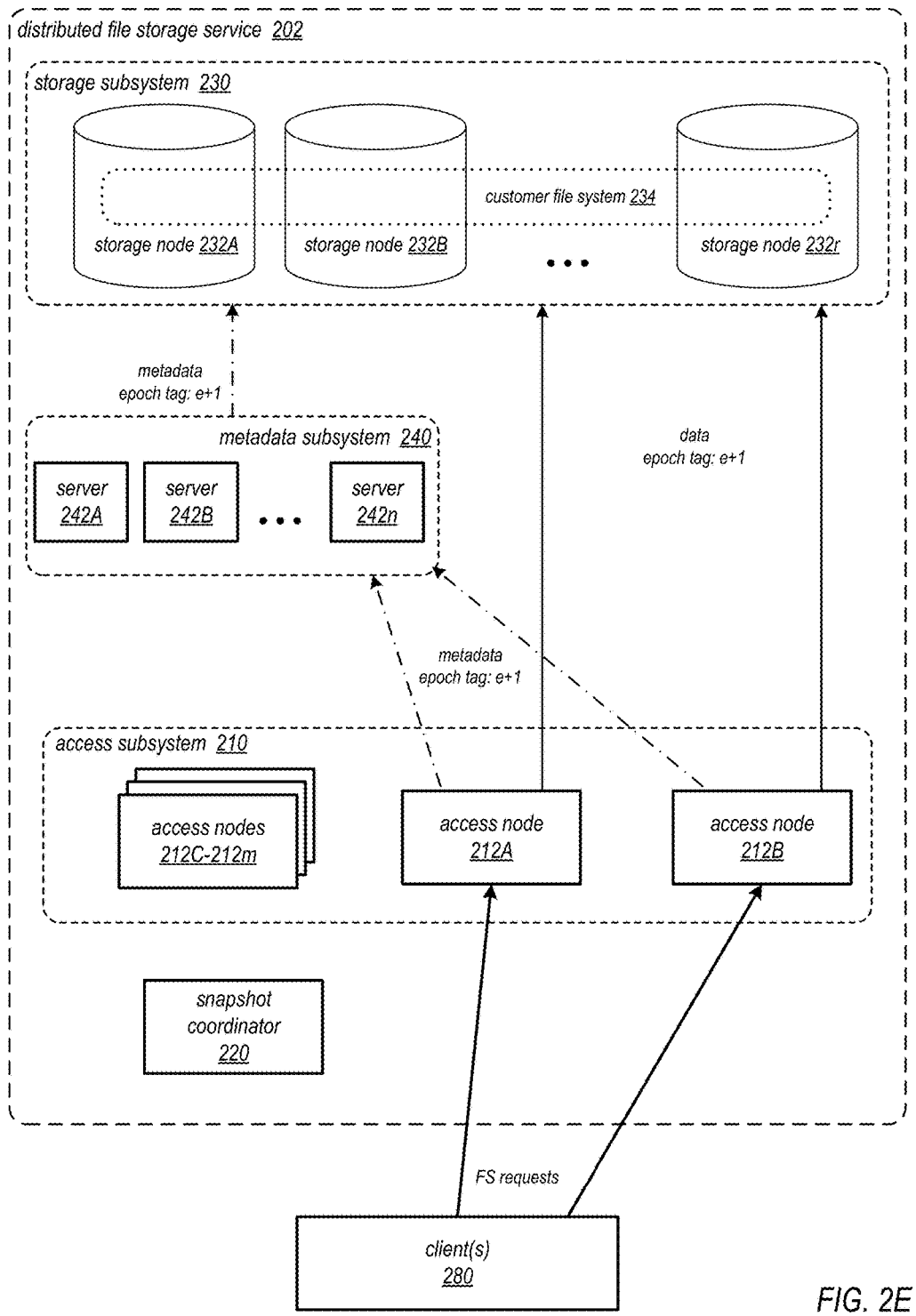

In response to receiving the commit messages 226, access nodes 212A and 212B may increment the locally stored epoch number, which thus becomes e+1. As shown in FIG. 2E, the access nodes 212A and 212B may then resume processing of the FS requests from clients 280 and sending metadata write requests to metadata subsystem 240 and data write requests to storage subsystem 230; the write requests are tagged with the new epoch number e+1, as shown in FIG. 2E. In some embodiments, a preserve flag field in the write requests is set to true to indicate to the backend storage system 230 that copy-on-write operations are to be performed for the data and metadata write requests.

In some embodiments, if an access node 212 does not receive a commit message 226 within the time period to wait (e.g., 100 ms) for a commit message from the snapshot coordinator 220, the access node 212 may presume commitment to a new snapshot epoch, increment the locally stored epoch number, and resume processing of the FS requests from clients 280 and sending metadata write requests to metadata subsystem 240 and data write requests to storage subsystem 230 tagged with the new epoch number.

In some embodiments, the two-phase commit process for transitioning to a new snapshot epoch as illustrated in FIGS. 2B through 2E may fail for some reason. For example, at FIGS. 2C and 2D, if the snapshot coordinator 220 does not receive response messages 224 from all of the access nodes 212 that are assigned to the file system 234 within the designated time period, the snapshot coordinator 220 may assume that the process has failed. In some embodiments, in response to the process failing, the snapshot coordinator 220 may restart the two-phase commit process at FIG. 2B by again sending prepare messages 222 to the access nodes 212. The two-phase commit process may be restarted one or more times until a consistent snapshot point has been established for the file system 234.

Figure 2F:
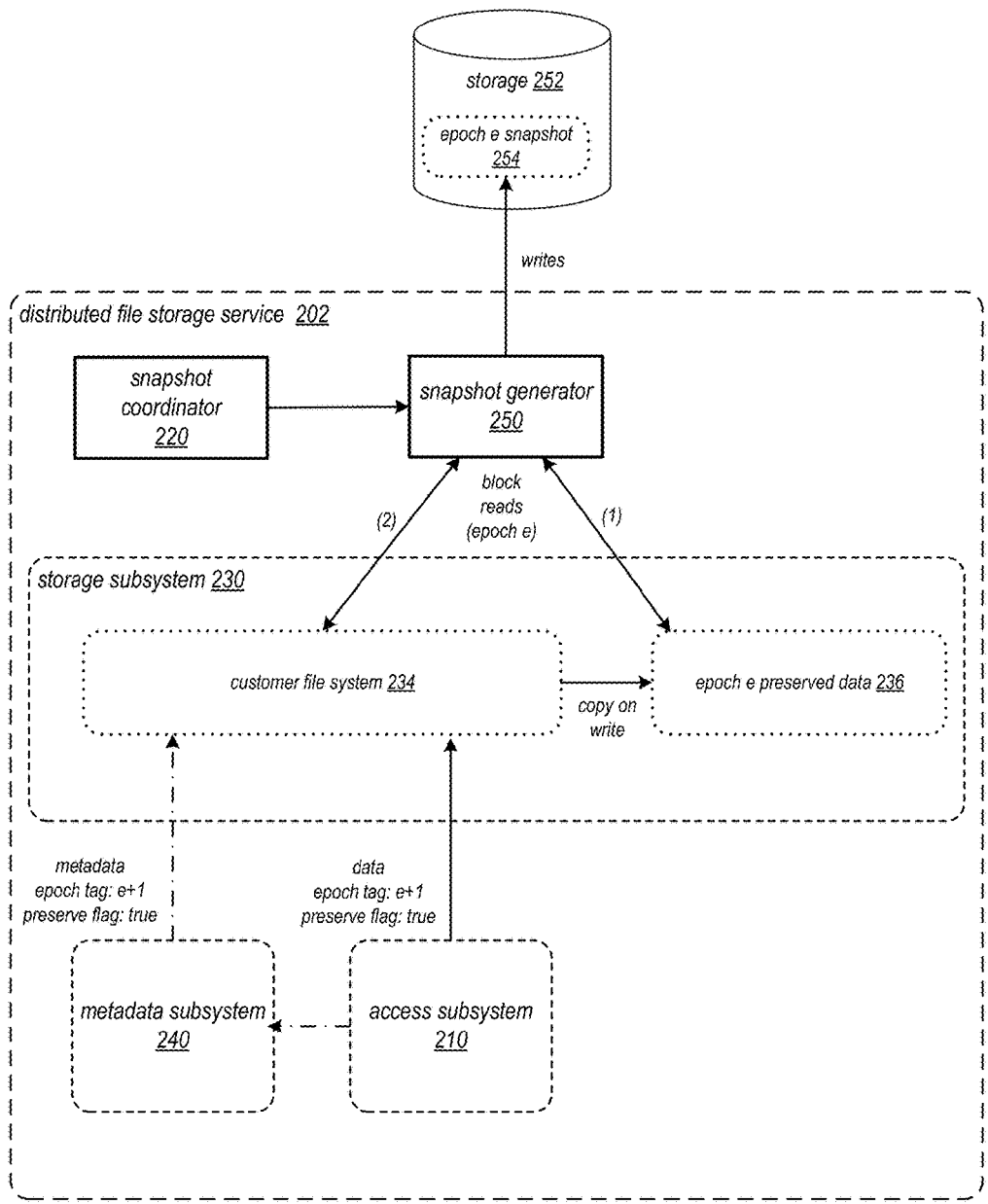
FIGS. 2F and 2G illustrate snapshot generation for a FS after a successful snapshot epoch transition, according to some embodiments.
Figure 2G:
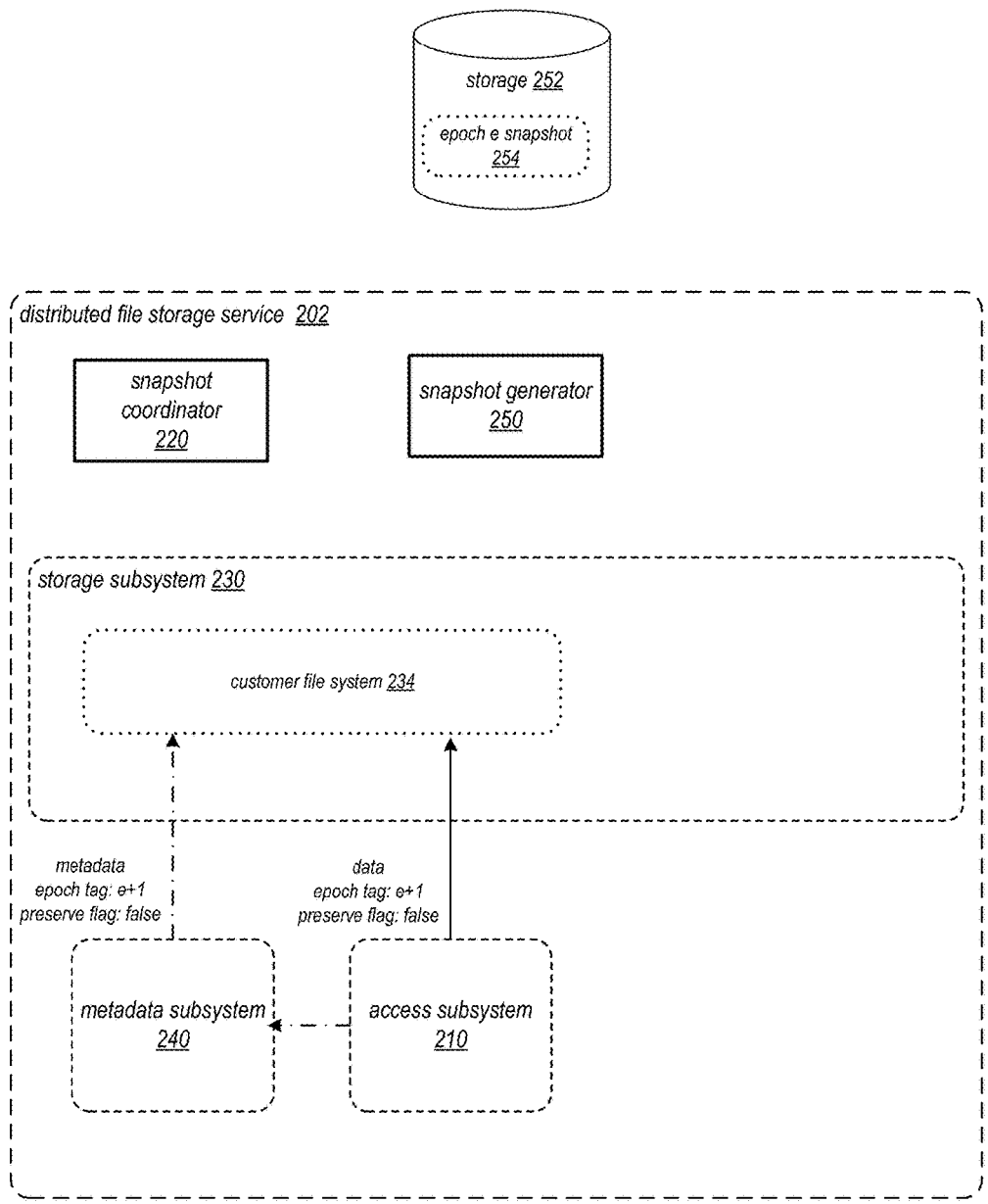

FIGS. 2F and 2G illustrate snapshot generation for a FS after a successful snapshot epoch transition, according to some embodiments. In FIG. 2F, access nodes assigned to file system 234 in access subsystem 210 send data write operations tagged with the new epoch number e+1, and with the preserve flag set to true, to the backend storage subsystem 230. Metadata operations for file system 234 are passed to the metadata subsystem 240, which generates and sends metadata write operations tagged with the new epoch number e+1, and with the preserve flag set to true, to the backend storage subsystem 230. For both metadata and data writes to the file system 234, storage subsystem 230 performs copy-on-write operations, which copies previous epoch (epoch e) metadata and data to a side location 236 (e.g., an area of storage on storage nodes 232 set aside for use as temporary storage) and writes or updates the new (epoch e+1) metadata at file system 234's main locations (e.g., extents) on storage nodes 232.

After a successful snapshot epoch transition, snapshot coordinator 220 may signal a snapshot generator 250, for example implemented as a set of processes or threads executing at one or more physical or virtualized servers, to start generating a snapshot of file system 234 at epoch e. Snapshot generator 250 may then traverse the file system 234 (e.g., by accessing and beginning at the root inode as indicated in file system 234's superblock) to read all of file system 234's metadata and data blocks as of epoch e (and prior to epoch e+1) and store the file system 234's metadata and data as of epoch e to an epoch e snapshot 254 on external storage 252. Storage 252 may, for example, be provided by a storage service of a provider network as illustrated in FIGS. 14 through 17. File system 234's metadata and data as of epoch e may be stored in snapshot 254 in a storage format that is different than that of storage subsystem 230. In some embodiments, snapshot generator 250 may generate and store metadata for the snapshot 254 that indicates at least the basic format of the snapshot.

In some embodiments, when reading file system 234's metadata and data blocks from storage subsystem 230, the snapshot generator 250 may first look in preserved data 236 to see if a given block is stored there. If it is, the snapshot generator 250 reads the block from preserved data 230. If not, the snapshot generator 250 reads the block directly from file system 234. Note that metadata and data blocks in file system 234 may be tagged with the new epoch number e+1 if written to since the snapshot epoch transition, may be tagged with previous epoch number e, or may be tagged with older epoch numbers (e.g., e−1, e−2, etc.). (The metadata and data blocks in preserved data 236 may be tagged epoch number e, or may be tagged with older epoch numbers). Thus, to generate a complete snapshot 254 of file system 234 as of epoch e, snapshot generator 250 reads all blocks of file system 234 that are tagged with epoch number e or older. In some embodiments, a partial or incremental snapshot may be generated by reading only blocks tagged with epoch number e.

In some embodiments, the copy-on write operations and thus the snapshot generation process as illustrated in FIG. 2F may fail for some reason. For example, memory space in side location 236 may be limited, and may be shared with other file systems or used for other temporary data storage by the storage subsystem 230 or other processes. Thus, the storage subsystem 230 may run out of memory space in the side location 236 when performing copy-on-write operations for the file system 234 and may not be able to copy previous epoch data to the side location 236 on copy-on-write operations. In this case, since all of the previous epoch data is not preserved, a complete snapshot cannot be generated, and the snapshot generation process fails. Upon snapshot generation failure, the snapshot generator 250 may inform the snapshot coordinator 220, which may then return to FIG. 2B to restart the entire process.

In FIG. 2G, generation of snapshot 254 is complete. Upon completion of the snapshot 254, the snapshot coordinator 220 may inform the access nodes in access subsystem 210 that are assigned to the file system 234 that the snapshot 254 is complete. The access nodes may then set the preserve flag to false in all subsequent write operations to the file system 234, which causes the storage system 230 to stop performing copy-on-write operations for the file system 234, and frees the storage space that was used for epoch e preserved data 236. The snapshot generator 220 may also inform the customer, who may then access the snapshot 254 from storage 252 to create backup copies of the file system, clone the file system, or for other purposes.

Figure 4:
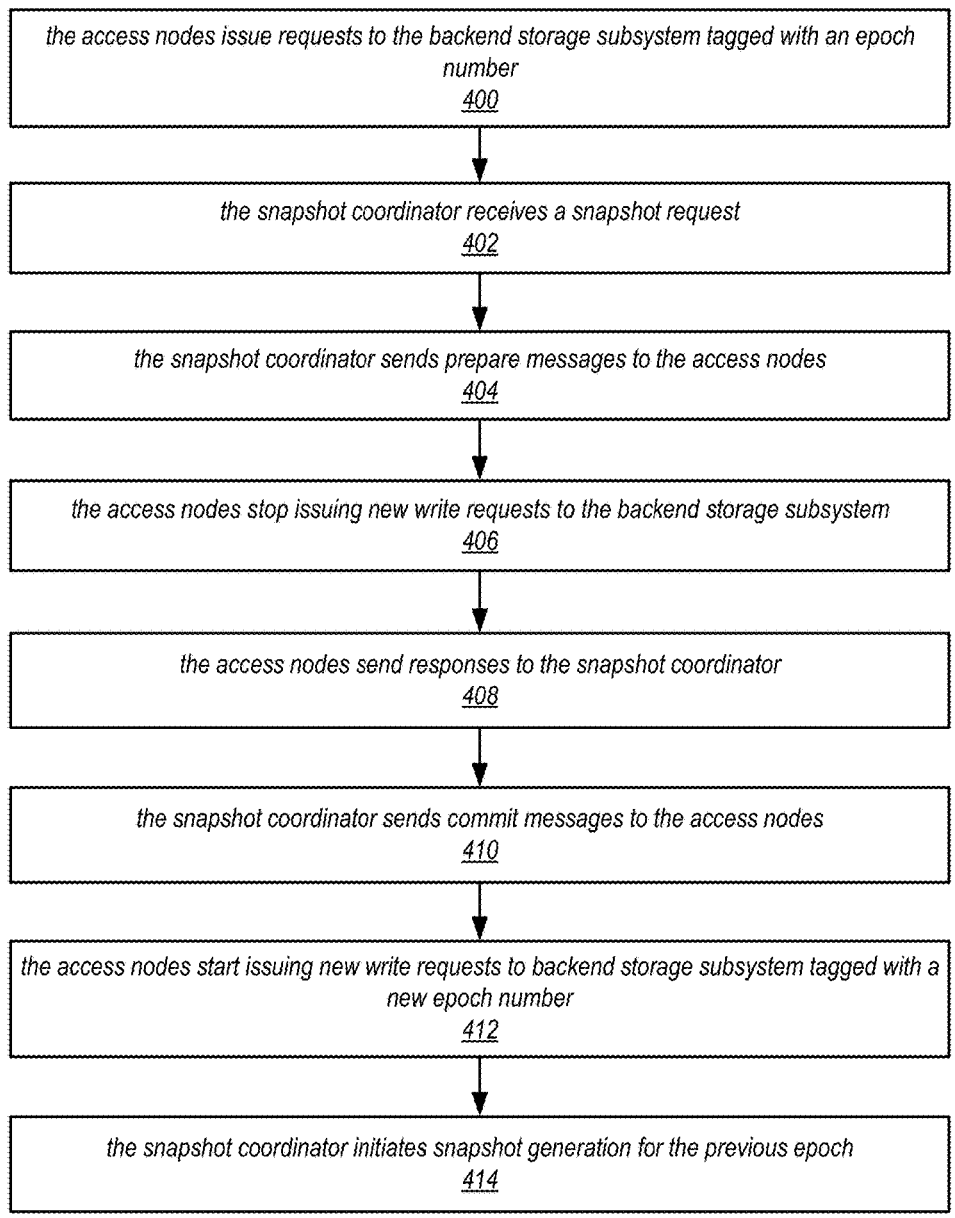
FIG. 4 is a high-level flowchart of a method for providing consistent snapshot points for a FS in a DFSS as illustrated in FIG. 1, according to some embodiments.

FIG. 4 is a high-level flowchart of a method for providing consistent snapshot points for a customer file system in a DFSS as illustrated in FIG. 1, according to some embodiments. As indicated at 400, during normal operations, a set of two or more access nodes assigned to a file system receive FS requests from clients of the file system, process the FS requests, and issue requests to the backend storage subsystem; the requests including read operations as well as metadata and data write operations tagged with a current epoch number. In some embodiments, at least some of the metadata requests may be passed to a metadata server assigned to the FS, which processes the requests and issues the metadata read and write operations.

As indicated at 402, a snapshot coordinator of the DFSS receives a snapshot request. For example, a request to perform a snapshot request may be generated by selecting a capture snapshot user interface element 1002 of a user interface 1000 displayed on a customer console 282 as illustrated in FIG. 9. As another example, the customer may schedule in advance one-time or periodic snapshots for their file system 234 via a user interface element 1004 of a user interface 1000 displayed on a customer console 282 as illustrated in FIG. 9.

As indicated at 404, in response to the snapshot request, the snapshot coordinator sends prepare messages to each of the access nodes that are assigned to the file system. In some embodiments, the snapshot coordinator sends the prepare messages only to the access nodes that are assigned to the file system. However, since the set of access nodes that are assigned to the file system may change, in some embodiments the snapshot coordinator may send prepare messages to all access nodes in the access subsystem.

As indicated at 406, in response to the prepare messages, the access nodes stop issuing new write requests to the backend storage subsystem. The access nodes may still receive new FS requests from clients of the file system; the new FS requests may be queued, but the access nodes temporarily suspend processing of new FS requests, and the access nodes thus do not send metadata and data write operations to the metadata subsystem and backend storage subsystem to fulfill the new FS requests. Any pending metadata and data write operations from previous FS requests may still be sent to the metadata subsystem and backend storage subsystem to complete operations in the current epoch. In some embodiments, the access nodes may stop issuing new read requests to the backend storage system as well as new write requests. However, in some embodiments, the access nodes may continue to issue new read requests to the backend storage system while new write requests are suspended. The storage subsystem may continue to send responses to any pending read or write operations to the access nodes.

As indicated at 408, the access nodes send responses to the snapshot coordinator to indicate that they are ready to commit to a new snapshot epoch. The access nodes may also set a presume-commit timer indicating a time period to wait (e.g., for 100 ms) for a commit message from the snapshot coordinator before presuming commitment to a new snapshot epoch. The time period may, for example, be estimated based on how long it typically takes to drain any pending write operations. In embodiments where the snapshot coordinator sends prepare messages to all access nodes in the fleet, access nodes that are not in the set of access nodes assigned to the file system may respond to the snapshot coordinator to indicate that they are not assigned to the file system.

As indicated at 410, upon receiving responses from all access nodes that are in the set of access nodes assigned to the file system, the snapshot coordinator sends commit messages to the access nodes assigned to the file system. In some embodiments the snapshot coordinator may send commit messages to all access nodes in the fleet; access nodes that are not currently assigned to file system may simply ignore the messages, or may respond indicating that they are not assigned to the file system.

As indicated at 412, the access nodes may start issuing new requests to the backend storage subsystem tagged with the new epoch number. In some embodiments, in response to receiving the commit messages, the access nodes may increment a locally stored epoch number. The access nodes may then resume processing of the FS requests from the file system clients and sending metadata write requests to the metadata subsystem and data write requests to the storage subsystem; the write requests are tagged with the new epoch number. In some embodiments, a preserve flag field in the write requests is set to true to indicate to the backend storage system that copy-on-write operations are to be performed for the data and metadata write requests.

In some embodiments, if an access node does not receive a commit message within the time period to wait (e.g., 100 ms) for a commit message from the snapshot coordinator, the access node may presume commitment to a new snapshot epoch, increment the locally stored epoch number, and resume processing of the FS requests from clients and sending metadata write requests to metadata subsystem and data write requests to storage subsystem tagged with the new epoch number.

As indicated at 414, snapshot coordinator initiates snapshot generation for the previous epoch of the file system. In some embodiments, the two-phase commit process for transitioning to a new snapshot epoch described above is determined to be successful by the snapshot coordinator when the snapshot coordinator receives response messages from all of the access nodes that are assigned to the file system within a designated time period and issues the commit messages to the access nodes. After a successful snapshot epoch transition, the snapshot coordinator may signal a snapshot generator, for example implemented as a set of processes or threads executing at one or more physical or virtualized servers, to start generating a snapshot of the file system for the previous epoch. The snapshot generator then generates a snapshot of the file system that includes results of all write operations as of the previous epoch, but none of the results of the write operations of the new (current) epoch.

Figure 5:
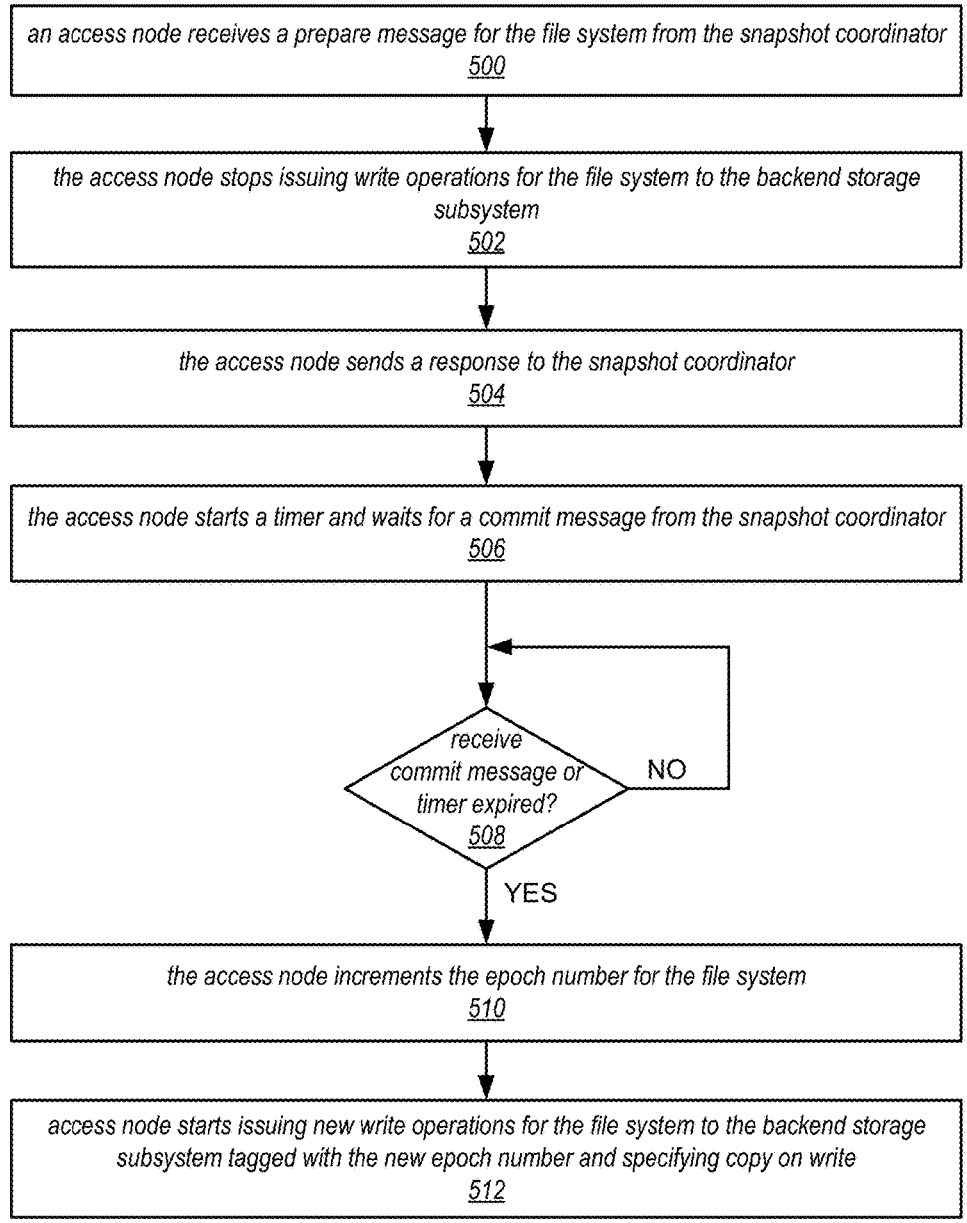
FIG. 5 is a flowchart of a method for performing a snapshot epoch transition on an access node of the DFSS, according to some embodiments.

FIG. 5 is a flowchart of a method for performing a snapshot epoch transition for a file system on an access node of the DFSS, according to some embodiments. To prevent unacceptable delays in FS operations at the clients, the access nodes may use a presume-commit timer. The access nodes may set the presume-commit timer indicating a time period to wait (e.g., for 100 ms) for a commit message from the snapshot coordinator before assuming commitment to a new snapshot epoch. The time period may, for example, be estimated based on how long it typically takes to drain any pending write operations. File system operations, suspended upon receiving a prepare message from the snapshot coordinator, are resumed if the timer expires before receiving a commit message from the snapshot coordinator.

As indicated at 500, an access node assigned to the file system receives a prepare message for the file system from the snapshot coordinator. As indicated at 502, the access node stops issuing new write operations for the file system to the backend storage subsystem. As indicated at 504, the access node sends a response to the snapshot coordinator. In some embodiments, after suspending write operations to the backend storage subsystem and before sending the response to the snapshot coordinator, the access node waits for any pending write operations to the backend storage subsystem to complete. In some embodiments, the backend storage subsystem messages the access node upon success (or failure) of a write operation, and thus the access node may wait until it has received messages from the backend storage subsystem indicating completion (success or failure) of any pending write operations. As indicated at 506, the access node starts a presumed commit timer and waits for a commit message from the snapshot coordinator. At 508, if the access node receives a commit message or if the timer expires before receiving a commit message, the access node increments the epoch number for the file system as indicated at 510, and starts issuing new write operations to the backend storage subsystem tagged with the new epoch number and specifying copy-on-write as indicated at 512. In cases where the access node presumes commitment to the new snapshot epoch in response to the timer expiring before receiving a commit message from the snapshot coordinator, the access node may subsequently receive a commit message. However, the access node may instead receive another prepare message (indicating that the snapshot coordinator is retrying a failed attempt to establish a consistent snapshot point), in which case the method returns to element 502.

In some embodiments, the access node may validate inputs from the snapshot coordinator. For example, in some embodiments prepare messages received from the snapshot coordinator may indicate a target epoch number; the access node may validate that the target epoch number in a received prepare message is higher than the current epoch number at the access node. If the target epoch number indicated by the prepare message is older than the current epoch number at the access node, the access node may assume that the prepare message is out of order and thus ignore the prepare message. In some embodiments, commit messages may be similarly validated.

Figure 6:
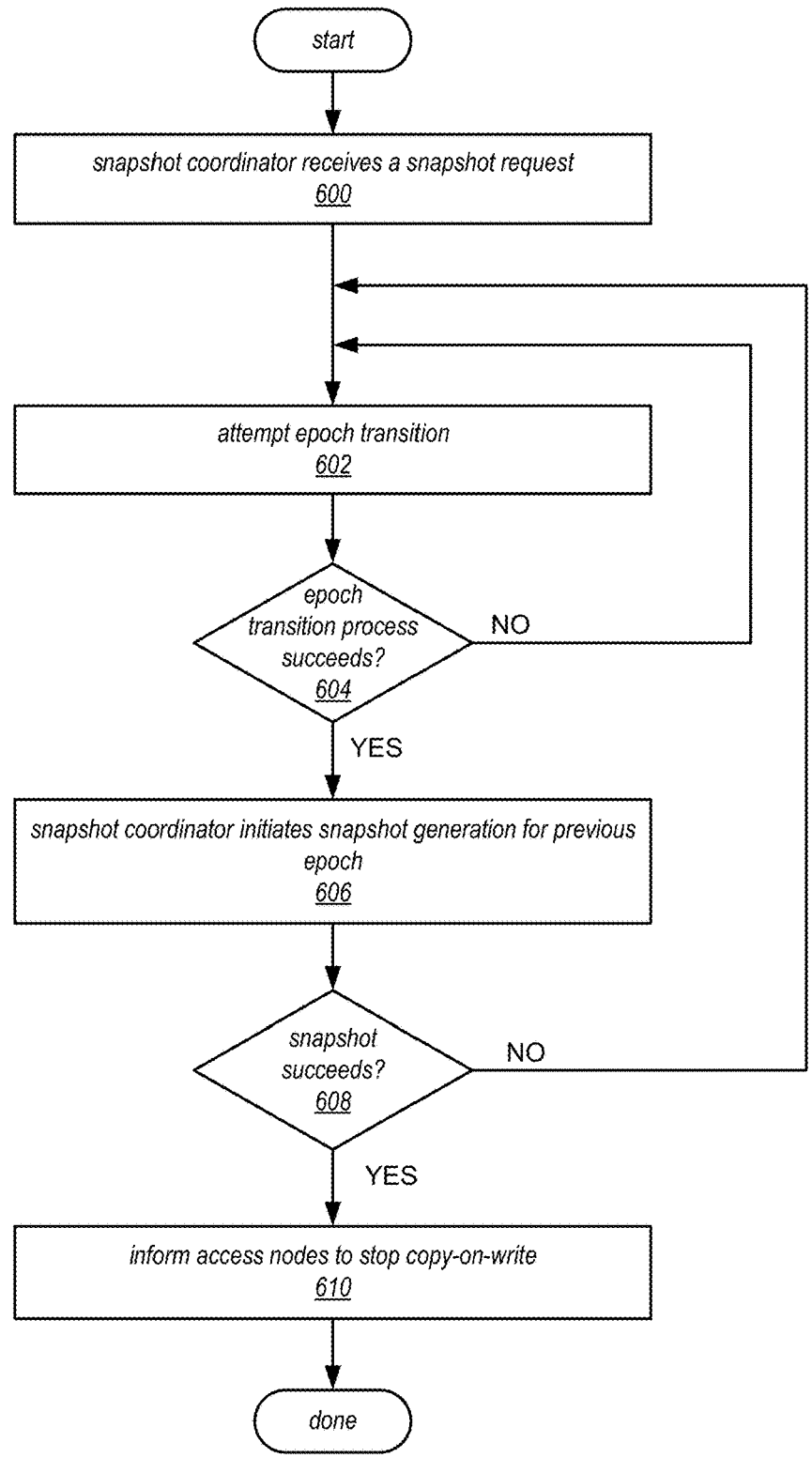
FIG. 6 is a high-level flowchart of a method for generating a consistent snapshot for a FS in a DFSS as illustrated in FIG. 1, according to some embodiments.

FIG. 6 is a high-level flowchart of a method for generating a consistent snapshot for a FS in a DFSS as illustrated in FIG. 1, according to some embodiments. In some embodiments, the two-phase commit process for transitioning to a new snapshot epoch as illustrated in FIGS. 2B through 2E and in FIG. 4 may fail for some reason. For example, if the snapshot coordinator does not receive response messages from all of the access nodes that are assigned to the file system within a designated time period, the snapshot coordinator may assume that the process has failed. In addition, in some embodiments, the copy-on write operations and thus the snapshot generation process as illustrated in FIG. 2F may fail for some reason. For example, the snapshot generator may run out of memory space in the side location (e.g., an area of storage on the storage nodes set aside for use as temporary storage) and thus may not be able to copy previous epoch data to the side location on copy-on-write operations. In this case, since all of the previous epoch data is not preserved, a complete snapshot cannot be generated, and the snapshot generation process aborts.

Figure 7:
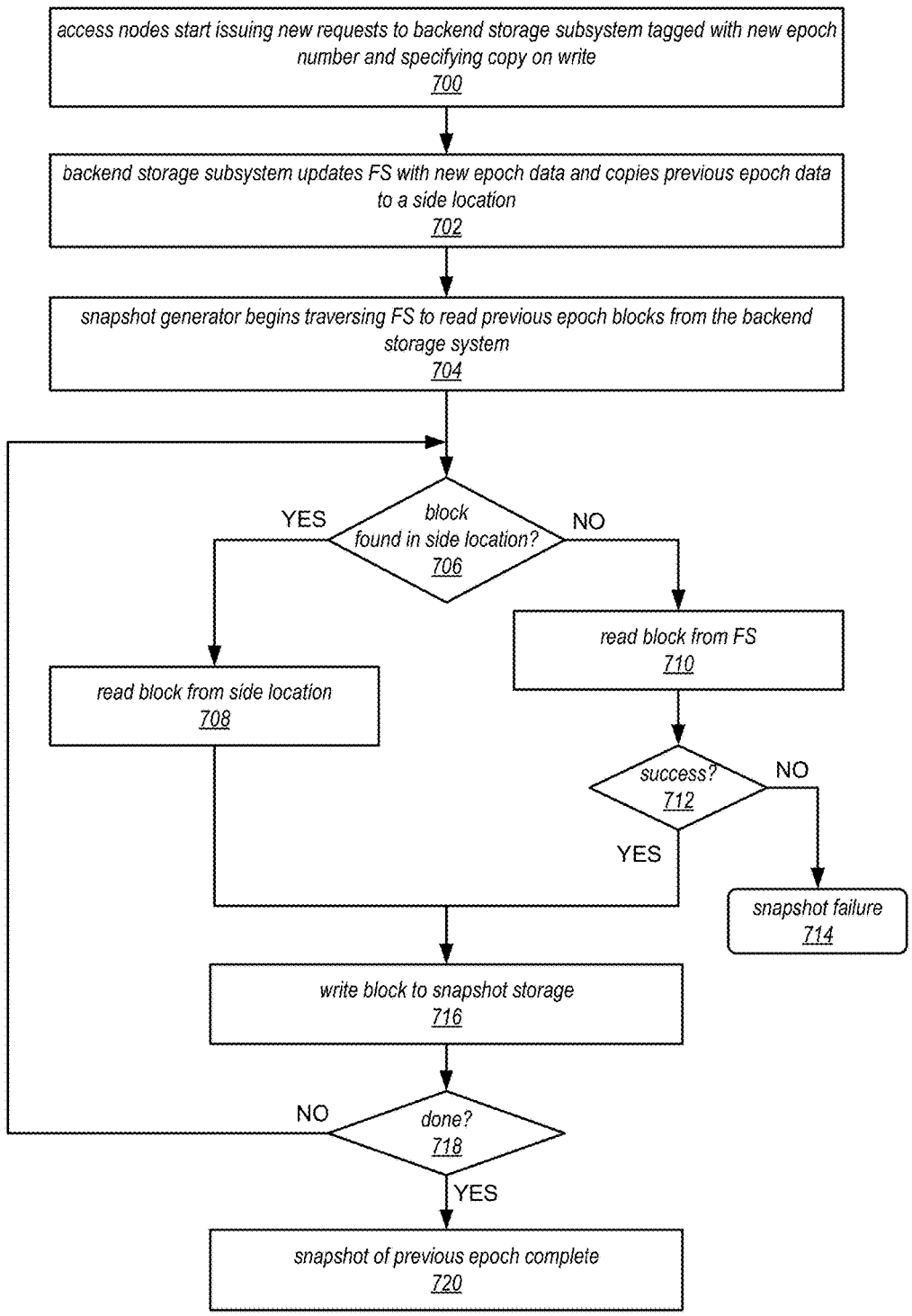
FIG. 7 is a flowchart of a method for snapshot generation for a FS after a successful snapshot epoch transition, according to some embodiments.

As indicated at 600, the snapshot coordinator receives a snapshot request. At 602, the snapshot coordinator attempts an epoch transition, for example as illustrated in FIGS. 2B through 2E and at elements 404 through 410 of FIG. 4. In some embodiments, the epoch transition succeeds if all access nodes respond to the prepare message within a specified time period; otherwise, the snapshot coordinator may assume that the epoch transition failed. At 604, if the epoch transition succeeds, the snapshot coordinator initiates snapshot generation for the previous epoch as indicated at 606. FIG. 7 illustrates a method for snapshot generation for a file system after a successful snapshot epoch transition, according to some embodiments. After the successful snapshot epoch transition, the access nodes set the preserve flag in write operations in the new epoch for the file system that are sent to the backend storage subsystem to true so that the backend storage subsystem copies the previous epoch data to side storage for the new epoch write operations to the file system. Otherwise, in response to the epoch transition failing, the method returns to element 602 to try again to establish a consistent snapshot point for the file system. The two-phase commit process may be restarted one or more times until a consistent snapshot point has been established for the file system. At 608, if snapshot generation succeeds, then the snapshot coordinator may inform the access nodes to stop copy-on-write operations, which causes the access nodes to set the preserve flag in write operations for the file system that are sent to the backend storage subsystem to false so that the backend storage subsystem no longer copies the previous epoch data to side storage for write operations to the file system. At 608, if snapshot generation fails, for example due to the backend storage subsystem running out of space in the side location to copy previous epoch data on copy-on-write operations, the method returns to element 602 to try again to establish a consistent snapshot point for the file system and generate a snapshot. In some embodiments, any previous epoch data or metadata that was stored to the side location during copy-on-write operations in a previous attempt may be flushed from the side location prior to restarting snapshot generation.

FIG. 7 is a flowchart of a method for snapshot generation for a file system after a successful snapshot epoch transition, according to some embodiments. As indicated at 700, the access nodes start issuing new requests to the backend storage subsystem tagged with the new epoch number and specifying copy-on-write. As indicated at 702, using copy-on-write operations in response to the requests, the backend storage subsystem updates the file system by storing the new epoch data to the primary or main locations (e.g., extents) for the file system on the storage nodes, and copying the previous epoch data stored at those locations to a side location (e.g., an area of storage on the storage nodes set aside for use as temporary storage).

After a successful snapshot epoch transition, the snapshot coordinator may signal a snapshot generator, for example implemented as a set of processes or threads executing at one or more physical or virtualized servers, to start generating a snapshot of the file system for the previous epoch. The snapshot generator may then traverse the file system (e.g., by accessing and beginning at the root inode as indicated in file system's superblock) to read all of the file system's metadata and data blocks as of the previous epoch and store the file system's metadata and data as of the previous epoch to external storage, for example storage by a storage service of a provider network as illustrated in FIGS. 14 through 17. The file system's metadata and data as of the previous epoch may be stored in snapshot in a storage format that is different than that of the DFSS's storage subsystem. In some embodiments, the snapshot generator may generate and store metadata for the snapshot that indicates at least the basic format of the snapshot.

To traverse the file system to generate the snapshot, as indicated at 704, the snapshot generator begins traversing the file system (e.g. at the root inode) to read previous epoch blocks from the backend storage system. The snapshot generator may first look for a previous epoch block in the side location. At 706, if the previous epoch block found in the side location, the snapshot generator reads the block from the side location as indicated at 708. Otherwise, if the previous epoch block is not found in the side location, then as indicated at 710 the snapshot generator attempts to read the previous epoch block directly from the file system. If the epoch number of the block read from the file system indicates that the block is from the previous (or older) epoch, then at 712 the read attempt at 710 is a success, and the method goes to element 716. Otherwise, if the epoch number of the block read from the file system indicates that the block has been updated in the new epoch, then at 712 the read attempt at 710 does not succeed, and the method goes to element 714 to handle a snapshot generation failure. Since the previous epoch block was not found in the side location, an epoch number for the block in the file system that is higher than the previous epoch indicates that the storage subsystem was not able to successfully perform copy-on-write for the block in the file system when modified by a write operation, for example because there was no available memory space for the block in the side location when the write operation to the file system was performed. Thus, the previous epoch block has not been located in either the side location or the file system, a complete snapshot for the previous epoch cannot be generated, and the snapshot generation process has failed. At 714, upon snapshot failure, the snapshot generator may inform the snapshot coordinator, which may restart the process (e.g., at 602 of FIG. 6) to try again to establish a consistent snapshot point for the file system and generate a successful snapshot.

As indicated at 716, after successfully reading a block from the side location or from the file system, the snapshot generator writes the block to the snapshot storage. At 718, once the snapshot generator is done traversing the file system, the snapshot of the previous epoch is complete, as indicated at 720. Otherwise, the snapshot generator returns to element 706 to get the next block.

Note that the metadata and data blocks in the file system may be tagged with the new epoch number if written to since the snapshot epoch transition, may be tagged with previous epoch number, or may be tagged with older epoch numbers. (The metadata and data blocks in the side location may be tagged with the previous epoch number or with older epoch numbers). Thus, to generate a complete snapshot of the file system as of the previous epoch, the snapshot generator reads all blocks of file system that are tagged with the previous or older epoch numbers. The snapshot generator thus generates a snapshot of the file system that includes results of all write operations as of the previous epoch, but none of the results of the write operations of the new (current) epoch. In some embodiments, a partial or incremental snapshot may be generated by reading only blocks tagged with the previous epoch number.

Upon completion of the snapshot at 716, the snapshot coordinator may inform the access nodes that are assigned to the file system that the snapshot is complete. The access nodes may then set the preserve flag to false in all subsequent write operations to the file system, which causes the storage system to stop performing copy-on-write operations for the file system, and frees the storage space that was used to preserve the previous epoch data. The snapshot generator may also inform the customer, who may then access the snapshot to create backup copies of the file system, clone the file system, or for other purposes.

Figure 8:
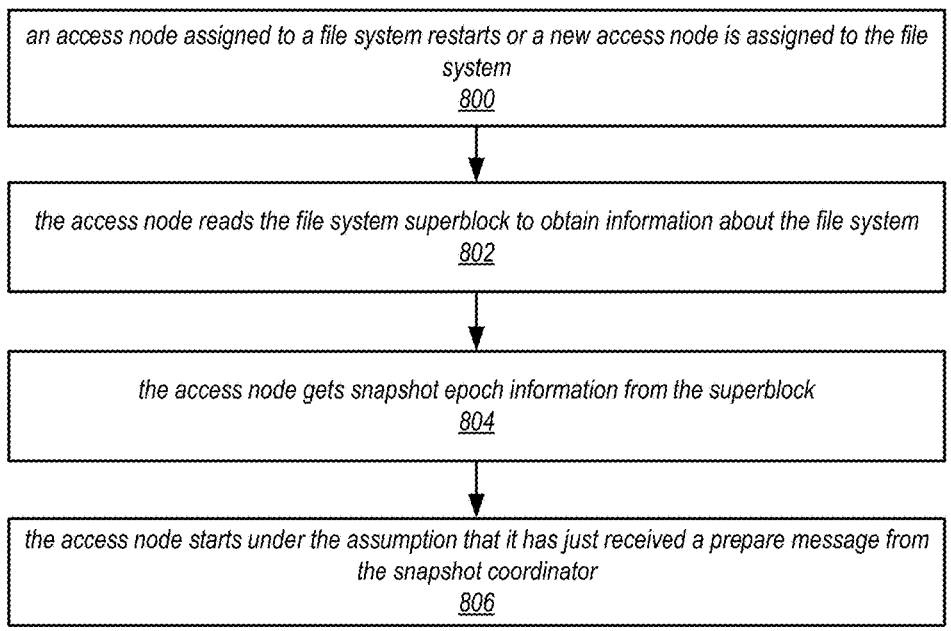
FIG. 8 illustrates an example restart method for an access node, according to some embodiments.

FIG. 8 illustrates an example restart method for an access node, according to some embodiments. As indicated at 800, an access node assigned to a file system may restart after a failure, or a new access node may be assigned to a file system. For example, an access node may fail after sending a response message to the snapshot coordinator in response to a prepare message. In either case, the access node does not know the status of the file system, and does not know if there is a snapshot transition in progress. As indicated at 802, upon being assigned to a file system or recovering from a failure while assigned to a file system, the access node may read the superblock (e.g., as illustrated in FIG. 3A) for the file system, and as indicated at 804 may obtain snapshot epoch information about the file system including but not limited to the current epoch number, the presume-commit time, and the preserve flag for the file system. As indicated at 806, the access node may then start under the assumption that it has just received a prepare message from the snapshot coordinator, and therefore performs elements 502 through 512 of FIG. 5. This causes the access node to delay issuing new writes to the storage subsystem for the presumed-commit period. The reason for this delay is that at the time of restart or of being assigned to the file system, the access node does not know whether there is an otherwise-successful snapshot attempt in progress, and if so whether writes at that point should be under the old or new snapshot epoch. After waiting the delay period however, writes under the new epoch are safe, whether the prior attempt was successful or is aborted.

Example Distributed File Storage Service

An example high-availability, high-durability, scalable distributed file storage service in which embodiments of the methods and apparatus for providing consistent snapshot points may be implemented is described. In at least some embodiments, the file storage service may be designed to support shared access to files by thousands of clients, where each individual file may include very large amounts (e.g., petabytes) of data, at performance, availability and durability levels that are targeted to be independent of the size of the file and/or the number of concurrent users. One or more industry-standard file system interfaces or protocols may be supported by the service, such as various versions of NFS (network file system), SMB (Server Message Block), CIFS (Common Internet File System) and the like. Accordingly, in at least some embodiments, the consistency models supported by the distributed file storage service may be at least as strong as the models supported by the industry-standard protocols—for example, the service may support sequential consistency. In a distributed system implementing a sequential consistency model, the result of an execution of operations implemented collectively at a plurality of executing entities (e.g., nodes or servers of the distributed system) is expected to be the same as if all the operations were executed in some sequential order. The file storage service may be designed for use by a wide variety of applications, such as file content serving (e.g. web server farms, software development environments, and content management systems), high performance computing (HPC) and "Big Data" applications such as media, financial, and scientific solutions requiring on-demand scaling of file store capacity and performance, and the like. The term "file store" may be used herein to indicate the logical equivalent of a file system—e.g., a given client may create two different NFS-compliant file stores FS1 and FS2, with the files of FS1 being stored within one set of subdirectories of a mountable root directory, and the files of FS2 being stored within a set of subdirectories of a different mountable root directory.

To help enable high levels of scalability, a modular architecture may be used for the service in at least some embodiments. For example, a physical storage subsystem including some number of multi-tenant storage nodes may be used for file store content, while a logically distinct metadata subsystem with its own set of metadata nodes may be used for managing the file store content in one implementation. The logical separation of metadata and data may be motivated, for example, by the fact that the performance, durability and/or availability requirements for metadata may in at least some cases differ from (e.g., more stringent than) the corresponding requirements for data. A front-end access subsystem, with its own set of access nodes distinct from the metadata and storage nodes, may be responsible for exposing network endpoints that allow clients to submit requests to create, read, update, modify and delete the file stores via the industry-standard interfaces, and for handling connection management, load balancing, authentication, authorization and other tasks associated with client interactions. Resources may be deployed independently to any one of the subsystems in some embodiments, e.g., to the access subsystem, the metadata subsystem, or the storage subsystem, without requiring corresponding deployment changes at the other subsystems. For example, if a triggering condition such as a potential performance bottleneck is identified in the access subsystem, or if some set of access subsystem nodes experience a network outage or other failure, additional access subsystem nodes may be brought online without affecting the storage or metadata subsystems, and without pausing the flow of client requests. Similar deployment changes may be made at other subsystems as well in response to various types of triggering conditions. In some embodiments, the access subsystem nodes in particular may be implemented in a largely stateless manner, so that recovery from access node failures may be especially efficient.

In at least some embodiments, the content of the file store metadata objects (e.g., data structures representing attributes of directory entries, links, etc.) may themselves be stored on devices managed by the storage subsystem—although, as described below, in some cases different policies may be applied to the storage objects being used for the data than are applied to the storage objects being used for metadata. In such embodiments, the metadata subsystem nodes may, for example, include various processes or threads of execution that execute metadata management logic and coordinate the storage of metadata content at the storage subsystem. A given storage subsystem node may include several different types of storage media in some embodiments, such as some number of devices employing rotating magnetic disks and some number of devices employing solid state drives (SSDs). In some embodiments a given storage subsystem node may store both metadata and data, either at respective different storage devices or on the same storage device. The term "file store object" may be used herein to refer collectively to data objects such as files, directories and the like that are typically visible to clients of the storage service, as well as to the internal metadata structures (including for example the mappings between logical blocks, physical pages and extents discussed below), used to manage and store the data objects.

In at least some embodiments, the distributed file storage service may be built using resources of a provider network, and may be designed primarily to fulfill storage requests from other entities within the provider network. Networks set up by an entity such as a company or a public sector organization to provide one or more network-accessible services (such as various types of cloud-based computing or storage services) accessible via the Internet and/or other networks to a distributed set of clients may be termed provider networks herein. Some of the services may be used to build higher-level services: for example, computing, storage or database services may be used as building blocks for a content distribution service or a streaming data processing service. At least some of the services of a provider network may be packaged for client use in service units called "instances": for example, a virtual machine instantiated by a virtualized computing service may represent a "compute instance". Computing devices at which such compute instances of the provider network are implemented may be referred to herein as "instance hosts" or more simply as "hosts" herein. A given instance host may include several compute instances, and the collection of compute instances at a particular instance host may be used to implement applications of one or more clients. In some embodiments, the file storage service may be accessible from some subset (or all) of the compute instances of a provider network, e.g., as a result of assigning the appropriate network addresses to the access subsystem nodes of the storage service, implementing the authorization/authentication protocols that are used for the virtual computing service, and so on. In some embodiments, clients outside the provider network may also be provided access to the file storage service. In various embodiments, at least some of the provider network services may implement a usage-based pricing policy—e.g., customers may be charged for a compute instance based at least partly on how long the instance was used, or on the number of requests of various types that were submitted from the compute instance. In at least some such embodiments, the file storage service may also employ usage-based pricing for at least some categories of client requests—e.g., the service may keep records of the particular file system interface requests that were completed on behalf of a given customer, and may generate billing amounts for the customer on the basis of those records.

The file store service may support high levels of data durability in some embodiments, e.g., using any of a number of different replication techniques. For example, in one embodiment, file store data and metadata may be physically stored using storage units called extents, and the content of an extent may be replicated at various physical storage devices. The content of an extent may be referred to herein as a "logical extent", to distinguish it from the physical copies at the different physical storage devices, which may be referred to as "extent replicas", "replica group members", or "extentlets" or a "replica group". In one implementation, for example, a file (or a metadata object) may be organized as a sequence of logical blocks, with each logical block being mapped to one or more physical data pages. A logical block may considered a unit of striping, in that at least in some implementations, the probability that the content of two different logical blocks of the same file (or the same metadata structure) are stored at the same storage device may be low. Each replica of a given logical extent may include some number of physical data pages. In some embodiments, erasure-coding based extent replicas may be used, while in other embodiments, other replication techniques such as full replication may be used. In at least one embodiment, a combination of erasure coding and full replication may be used. A given modification request from a client may accordingly be translated into a plurality of physical modifications at respective storage devices and/or respective storage subsystem nodes, depending on the nature of the replication policy in use for the corresponding file store object or metadata. In some embodiments, one or more of the extent replicas of a replica group may be designated as a master replica, and updates to the extent may be coordinated, e.g., using a consensus-based replicated state machine, by the storage service node that is hosting the current master. Such a storage service node may be termed a "master node" or a "leader" herein with respect to the extent for which it stores a master replica. In one implementation, if N extent replicas of a given logical extent are being maintained, a quorum of M (where M>=N/2) of the replicas may be needed, and such a quorum may be obtained using an update protocol initiated by the leader/master node, before a particular update is committed. In one embodiment, some extents may be used entirely for file content or data, while other extents may be used exclusively for metadata. In other embodiments, a given extent may store both data and metadata. In some implementations, a consensus-based protocol may be used to replicate log records indicating state changes of a given file store, and the content of the state may be replicated using a plurality of extents (e.g., using either full replication or erasure-coded replicas). Replicated state machines may also be used to ensure consistency for at least some types of read operations in various embodiments. For example, a single client read request may actually require a plurality of physical read operations (e.g., of metadata and/or data) at various extents, and the use of replicated state machines may ensure that the result of such a distributed read does not violate the read consistency requirements of the targeted file store.

A variety of different allocation and sizing policies may be used to determine the sizes of, and relationships among, logical blocks, physical pages, and/or the extents for data and metadata in different embodiments as described below. For example, in one straightforward implementation, a file may include some number of fixed size (e.g., 4-megabyte) logical blocks, each logical block may include some number of fixed size (e.g., 32-kilobyte) physical pages, and each extent may include sufficient storage space (e.g., 16 gigabytes) to store a fixed number of pages. In other embodiments, different logical blocks may differ in size, physical pages may differ in size, or extents may differ in size. Extents may be dynamically resized (e.g., grown or shrunk) in some embodiments. Static allocation may be used for logical blocks in some embodiments (e.g., all the physical storage for the entire logical block may be allocated in response to the first write directed to the block, regardless of the size of the write payload relative to the size of the block), while dynamic allocation may be used in others. Various techniques and policies governing logical block configurations and corresponding physical storage space allocations are described below in further detail. In some embodiments, different file stores managed by the file storage service may implement distinct block/page/extent sizing and configuration policies. Depending on the write sizes that the file system interfaces being used allow clients to specify, a given write operation from a client may result in the modification of only a part of a page rather than the whole page in some cases. If, in a given implementation, a physical page is the minimum level of atomicity with respect to writes supported by the storage subsystem, but write requests can be directed to arbitrary amounts of data (i.e., writes do not have to be page-aligned and do not have to modify all the content of an integral number of pages), some writes may be treated internally within the storage service as read-modify-write sequences. Details regarding an optimistic conditional-write technique that may be employed for writes that do not cross page boundaries in some such embodiments are provided below. In general, each storage device and/or storage service node may support operations for, and/or store data for, a plurality of different customers in at least some embodiments.

In general, metadata and/or data that may have to be read or modified for a single file store operation request received from a customer may be distributed among a plurality of storage service nodes. For example, delete operations, rename operations and the like may require updates to multiple elements of metadata structures located on several different storage devices. In accordance with the sequential consistency model, in at least one embodiment an atomic metadata operation including a group of file system metadata modifications may be performed to respond to a single client request, including a first metadata modification at one metadata subsystem node and a second metadata modification at a different metadata subsystem node. Various distributed update protocols that support sequential consistency may be used in different embodiments—e.g., a distributed transaction system described below in further detail may be used in at least some embodiments for such multi-page, multi-node or multi-extent updates. Of course, depending on the replication strategy being used, each one of the metadata modifications may in turn involve updates to a plurality of extent replicas in some embodiments.

In some embodiments, optimization techniques associated with various aspects of the file storage service, such as the use of object renaming protocols, load balancing techniques that take connection longevity into account, name space management techniques, client session metadata caching, offset-based congestion control policies, and the like, may be employed. Details on these features of the storage service are provided below in conjunction with the description of various figures.

Distributed File Storage Service Overview

Figure 10:
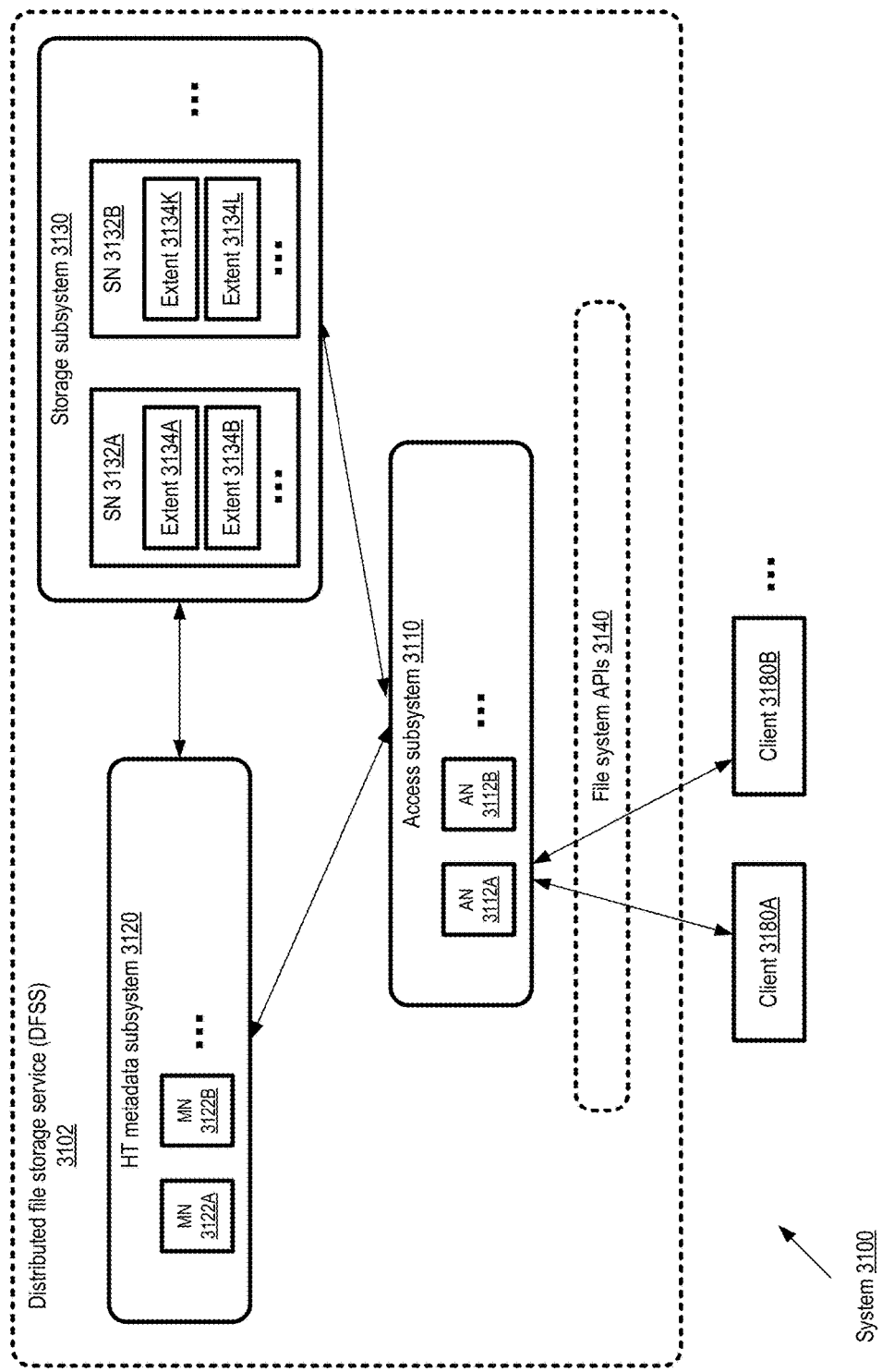
FIG. 10 provides a high-level overview of a distributed file storage service, according to some embodiments.

FIG. 10 provides a high-level overview of a distributed file storage service, according to some embodiments. As shown, system 3100 including storage service 3102 may be logically divided into at least three subsystems: a storage subsystem 3130, a metadata subsystem 3120 and an access subsystem 3110. Each subsystem may include a plurality of nodes, such as storage nodes (SNs) 3132A and 3132B of storage subsystem 3130, metadata nodes (MNs) 3122A and 3122B of metadata subsystem 3120, and access nodes (ANs) 3112A and 3112B of the access subsystem 3110. Each node may, for example, be implemented as a set of processes or threads executing at a respective physical or virtualized server in some embodiments. The number of nodes in any given subsystem may be modified independently of the number of nodes in the other subsystems in at least some embodiments, thus allowing deployment of additional resources as needed at any of the subsystems (as well as similarly independent reduction of resources at any of the subsystems). The terms "access server", "metadata server" and "storage server" may be used herein as equivalents of the terms "access node", "metadata node" and "storage node" respectively.

In the depicted embodiment, the storage nodes 3132 may be responsible for storing extents 3134 (such as extents 3134A and 3134B at storage node 3132A, and extents 3134K and 3134L at storage node 3132B), e.g., using some combination of SSDs and rotating disks. An extent, which may for example include some number of gigabytes of (typically but not always) contiguous storage space at some set of physical storage devices, may represent a unit of storage replication in some embodiments—thus, a number of physical replicas of any given logical extent may be stored. Each extent replica may be organized as a number of physical pages in some embodiments, with the pages representing the smallest units in which reads or writes are implemented within the storage subsystem. As discussed below with respect to FIG. 12, a given file store object (e.g., a file or a metadata structure) may be organized as a set of logical blocks, and each logical block may be mapped to a set of pages within a data extent. Metadata for the file store object may itself include a set of logical blocks (potentially of different sizes than the corresponding logical blocks for data), and may be stored in pages of a different extent 3134. Replicated state machines may be used to manage updates to extent replicas in at least some embodiments.

The access subsystem 3110 may present one or more file system interfaces to clients 3180, such as file system APIs (application programming interfaces) 3140 in the depicted embodiment. In at least some embodiments, as described below in further detail, a set of load balancers (e.g., software or hardware devices that may be configured independently of the storage service itself) may serve as intermediaries between the clients of the storage service and the access subsystem. In some cases, at least some aspects of load balancing functionality may be implemented within the access subsystem itself. In at least some embodiments the access subsystem nodes 3112 may represent service endpoints established within the appropriate network fabric that is concurrently being used by clients 3180. In some embodiments, special network addresses associated with isolated virtual networks may be assigned to ANs 3112. ANs 3112 may authenticate an incoming client connection, e.g., based on the client's network identity as well as user identity; in some cases the ANs may interact with identity/authentication services similar to Active Directory Service or Kerberos. Some file system protocols that may be supported by the distributed file storage service 3102 (such as NFSv4 and SMB2.1) may require a file server to maintain state, for example pertaining to locks and opened file identifiers. In some embodiments, durable server state, including locks and open file states, may be handled by the metadata subsystem 3120 rather than the access subsystem, and as a result the access subsystem may be considered a largely stateless server fleet that can be scaled up and down as needed. In some embodiments, ANs 3112 may cache metadata state pertaining to various file store objects, and may use the cached metadata to submit at least some internal I/O requests directly to storage nodes without requiring interactions with metadata nodes.

The metadata subsystem 3120 may be responsible for managing various types of file store metadata structures in the depicted embodiment, including for example the logical equivalents of inodes, file/directory attributes such as access control lists (ACLs), link counts, modification times, real file size, logical block maps that point to storage subsystem pages, and the like. In addition, the metadata subsystem may keep track of the open/closed state of the file store objects and of locks on various file store objects in some embodiments. The metadata subsystem 3120 may sequence and coordinate operations so as to maintain desired file store object consistency semantics, such as the close-to-open semantics expected by NFS clients. The metadata subsystem may also ensure sequential consistency across operations that may involve multiple metadata elements, such as renames, deletes, truncates and appends, e.g., using the distributed transaction techniques described below. Although the metadata subsystem 3120 is logically independent of the storage subsystem 3130, in at least some embodiments, persistent metadata structures may be stored at the storage subsystem. In such embodiments, even though the metadata structures may be physically stored at the storage subsystem, the metadata subsystem nodes may be responsible for such tasks as identifying the particular storage nodes to be used, coordinating or sequencing storage operations directed to the metadata, and so on. In at least some embodiments, the metadata subsystem may reuse some of the state management techniques employed by the storage subsystem in some embodiments, such as the storage subsystem's consensus-based state replication machinery.

Provider Network Implementations of a Distributed File Storage Service

In some embodiments the distributed storage service may be implemented using resources of a provider network, and may be used for file-related operations by applications or clients running at compute instances of the provider network. FIGS. 14 through 17 illustrate an example provider network environment, according to some embodiments. In some embodiments, a provider network may be organized into a plurality of geographical regions, and each region may include one or more availability containers, which may also be termed "availability zones" herein. An availability container in turn may include one or more distinct locations or data centers, engineered in such a way (e.g., with independent infrastructure components such as power-related equipment, cooling equipment, and physical security components) that the resources in a given availability container are insulated from failures in other availability containers. A failure in one availability container may not be expected to result in a failure in any other availability container; thus, the availability profile of a resource is intended to be independent of the availability profile of resources in a different availability container. Various types of applications may be protected from failures at a single location by launching multiple application instances in respective availability containers. Nodes of the various subsystems of the storage service may also be distributed across several different availability containers in some embodiments, e.g., in accordance with the availability/uptime goals of the service and/or the data redundancy requirements for various file stores. At the same time, in some implementations, inexpensive and low latency network connectivity may be provided between resources (such as the hosts or storage devices being used for the distributed file storage service) that reside within the same geographical region, and network transmissions between resources of the same availability container may be even faster. Some clients may wish to specify the locations at which at least some of the resources being used for their file stores are reserved and/or instantiated, e.g., at either the region level, the availability container level, or a data center level, to maintain a desired degree of control of exactly where various components of their applications are run. Other clients may be less interested in the exact location where their resources are reserved or instantiated, as long as the resources meet the client requirements, e.g., for performance, high availability, and so on.

In at least some embodiments, the resources within a given data center may be further partitioned into sub-groups based on differences in expected availability or failure resilience levels. For example, one or more server racks at a data center may be designated as a lower-level availability container, as the probability of correlated failures within a rack may at least in some cases be higher than the probability of correlated failures across different racks. At least in some embodiments, when deciding where to instantiate various components or nodes of the storage service, any combination of the various levels of availability containment described (e.g., the region level, the data center level, or at the rack level) may be taken into account together with performance goals and durability goals. Thus, for some types of storage service components, redundancy/replication at the rack level may be considered adequate, so in general different racks may be used for different components providing the same function (or storing replicas of the same data/metadata). For other components, redundancy/replication may also or instead be implemented at the data center level or at the region level.

Figure 11:
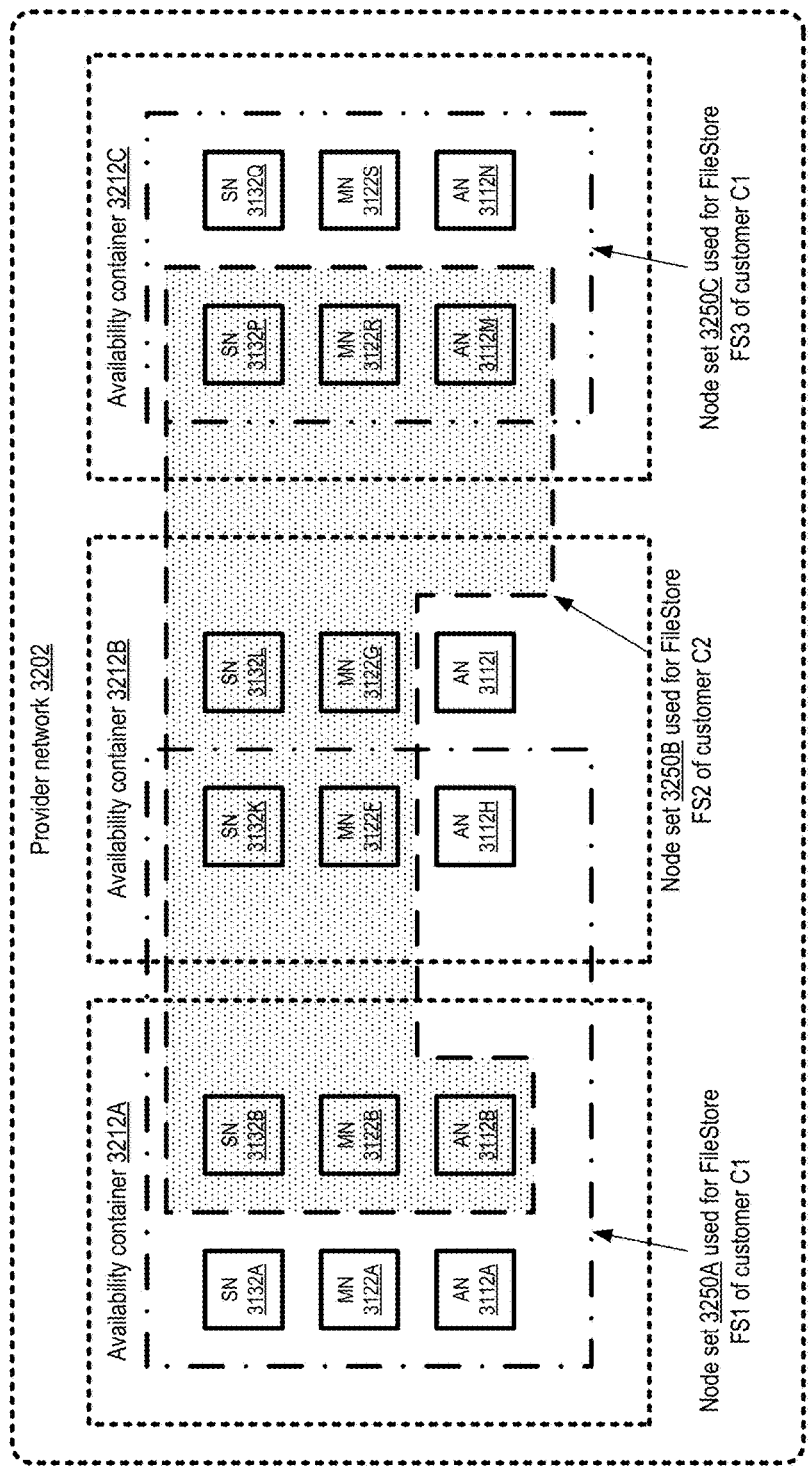
FIG. 11 illustrates the use of resources at a plurality of availability containers of a provider network to implement a file storage service, according to some embodiments.

FIG. 11 illustrates the use of resources at a plurality of availability containers 3212 of a provider network 3202 to implement a file storage service, according to some embodiments. In the embodiment depicted, three availability containers 3212A, 3212B and 3212C are shown, each of which include some number of storage nodes, metadata nodes and access nodes of the storage service. Since each availability container is typically set up so as to prevent correlated failure events that cross availability container boundaries, the set of storage service nodes that are assigned to a given file store may typically be spread across different availability containers. It is noted that some file stores may have lower availability or durability requirements than others, and may therefore be implemented within a single availability container in at least some embodiments. In one embodiment, when the file storage service is set up, a pool of nodes may be established for each of the three subsystems in each of several availability containers 3212, from which specific nodes may be assigned to a given file store as needed. In other embodiments, instead of establishing pre-configured storage service node pools, new nodes may be instantiated as needed.

The collection of ANs, MNs and SNs that collectively implement file storage for a given file store or file system may be referred to as a "node set" 3250 for that file store. In the embodiment shown in FIG. 11, the storage service nodes are multi-tenant, in that a given node of any of the subsystems may be responsible for handling requests from several different clients and/or several different customers. It is noted that in various embodiments, a given customer (e.g., a business entity or individual on whose behalf a billing account has been established at the storage service) may set up several different file stores in the depicted embodiment, and that many different client devices (computing devices from which programmatic interfaces may be invoked) may be used to issue file service requests to a single file store by, or on behalf of, a given customer. In at least some embodiments, multiple user accounts (e.g., one or more user accounts for each of several employees of a customer business organization) may be set up under the aegis of a single billing account, and each of the user accounts may submit file storage requests from a variety of client devices.

Node set 3250A of FIG. 11, used for file store FS1 of customer C1, includes SNs 3132A, 3132B and 3132K, MNs 3122A, 3122B and 3122F, and ANs 3112A, 3112B and 3112H, distributed among two availability containers 3212A and 3212B. Node set 3250B, used for file store FS2 of a different customer C2, includes nodes in three availability containers 3212A, 3212B and 3212C: SNs 3132B, 3132K, 3132L and 3132P, MNs 3122B 3122F, 3122G and 3122R, and ANs 3112B and 3112M. Node set 3250C, used for file store FS3 of customer C1, uses nodes of availability container 3212C alone: SNs 3132P and 3132Q, MNs 3122R and 3122S, and ANs 3112M and 3112N. The specific nodes that are to be used for a given file store may be selected on demand based on various factors, e.g., by a placement component of the storage service, and the node set may change over time in view of changing storage space needs, performance needs, failures and the like. A given storage device at a single storage node may store data and/or metadata belonging to different clients in at least some embodiments. In at least some embodiments, a single extent may include data and/or metadata of a plurality of clients or customers.

At least with respect to the SNs, redundancy or replication may be implemented along several different dimensions for a given file store in some embodiments. As the amount of data in a given file grows, for example, the various logical blocks of the file may in general be mapped to different logical extents. Thus, file striping may be implemented at the logical-block level, which may help to improve performance for certain patterns of I/O requests and may also reduce the time taken to recover a large file in case one of the storage nodes or devices being used for the file fails. Metadata for the file may also be striped across multiple metadata logical extents and managed by multiple MNs in some implementations. Each logical extent (whether for data or metadata) in turn may be replicated across multiple SNs at different availability containers 3212, e.g., using erasure coding or full replication, to achieve the desired degree of data durability. As noted earlier, in at least one embodiment replication may be implemented across lower-level availability containers, e.g., by choosing different racks within the same data center for different replicas. ANs and MNs may also be organized into redundancy groups in some embodiments, so that if some AN or MN fails, its workload may be quickly taken up by a different member of its redundancy group.

In some embodiments, a provider network 3202 may support establishment of "isolated virtual networks" (IVNs) on behalf of various customers. An IVN (which may also be referred to in some environments as a virtual private cloud or VPC) set up for a given customer may include a collection of computing and/or other resources in a logically isolated section of the provider network, over which the customer is granted substantial control with respect to networking configuration. In some embodiments, for example, a customer may select the IP (Internet Protocol) address ranges to be used for the IVN resources, manage the creation of subnets within the IVN, and the configuration of route tables, gateways, etc. for the IVN. For at least some of the devices within an IVN in some embodiments, the network addresses may not be visible outside the IVN, at least by default. In order to enable connectivity between an IVN and the customer's external network (e.g., devices at the customer's data center or office premises), a virtual interface that is configured for use with private addresses (and may therefore be termed a private virtual interface) and a virtual private gateway may be set up. In some embodiments one or more VPNs (virtual private networks) may be configured between the customer's IVN and external networks (such as the customer's office network or the customer's data centers). In at least some embodiments, such VPNs may utilize secure networking protocols such as IPSec (Internet Protocol Security), SSL/TLS (Secure Sockets Layer/Transport Layer Security), DTLS (Datagram Transport Layer Security) and the like.

In some embodiments, for security or other reasons, access to a given file store managed by a distributed storage service may be limited to a specific set of client devices within one or more IVNs. FIG. 3 illustrates a configuration in which network addresses associated with isolated virtual networks 302 are assigned to access subsystem nodes of a storage service, according to some embodiments. As a consequence of such address assignments, only those clients whose network addresses also lie within the IVN may be able to access the file store via the ANs 3112. As shown, the provider network 3202 in FIG. 3 includes SNs 3132A-132F, MNs 3122A-122F, and ANs 3112A-112F. Two IVNs 302A and 302B have been set up in the provider network 3202, for customers A and B respectively. Each IVN includes a number of compute instances (CIs) of virtual computing service 302, at which applications that require file storage services may be run. In addition to the CIs shown within the IVNs 302A (e.g., CIs 380A and 380B) and 302B (CIs 380K and 380L), other CIs (e.g., 380P and 380Q) may also run on instance hosts outside the IVNs in the depicted embodiment—thus, not all clients of the file storage service need necessarily belong to an IVN 302.

In order to enable access to the file storage service from CIs within IVN 302A, ANs 3112A and 3112D have been assigned private IP (Internet Protocol) addresses 350A associated with IVN 302A. As a result, client CIs 380A and 380B of IVN 302A may invoke the file storage service interfaces using addresses 350A, and may be able to rely on various network isolation and security features already implemented for IVNs when interacting with the file storage service. Similarly, ANs 3112D and 3112E may be assigned private network addresses of IVM 302B, enabling secure access from client CIs 380K and 380L of IVN 302B. It is noted that a given AN (such as 3112D) may be assigned more than one network address in at least some embodiments, allowing a single AN's resources to be shared by multiple IVNs. In other embodiments, each AN may be restricted to network addresses of no more than one IVN. In addition to the private addresses, in some embodiments, public network addresses (e.g., IP addresses accessible from the public Internet) may also be used for at least some ANs such as AN 3112C, enabling access from CIs such as 380P or 380Q that are not part of an IVN. In one embodiment, clients located outside the provider network 3202 may also be able to access the storage service using public IP addresses. In some embodiments, a single (private or public) network address may be assigned to a plurality of ANs 3112, so that, for example, incoming work requests may be balanced across multiple ANs, and AN failover may be implemented without impacting clients (e.g., clients may continue to send file store requests to the same address even after a particular AN fails, because the remaining ANs with the same network address may continue to respond to client requests).

Logical Blocks, Pages, and Extents

Figure 12:
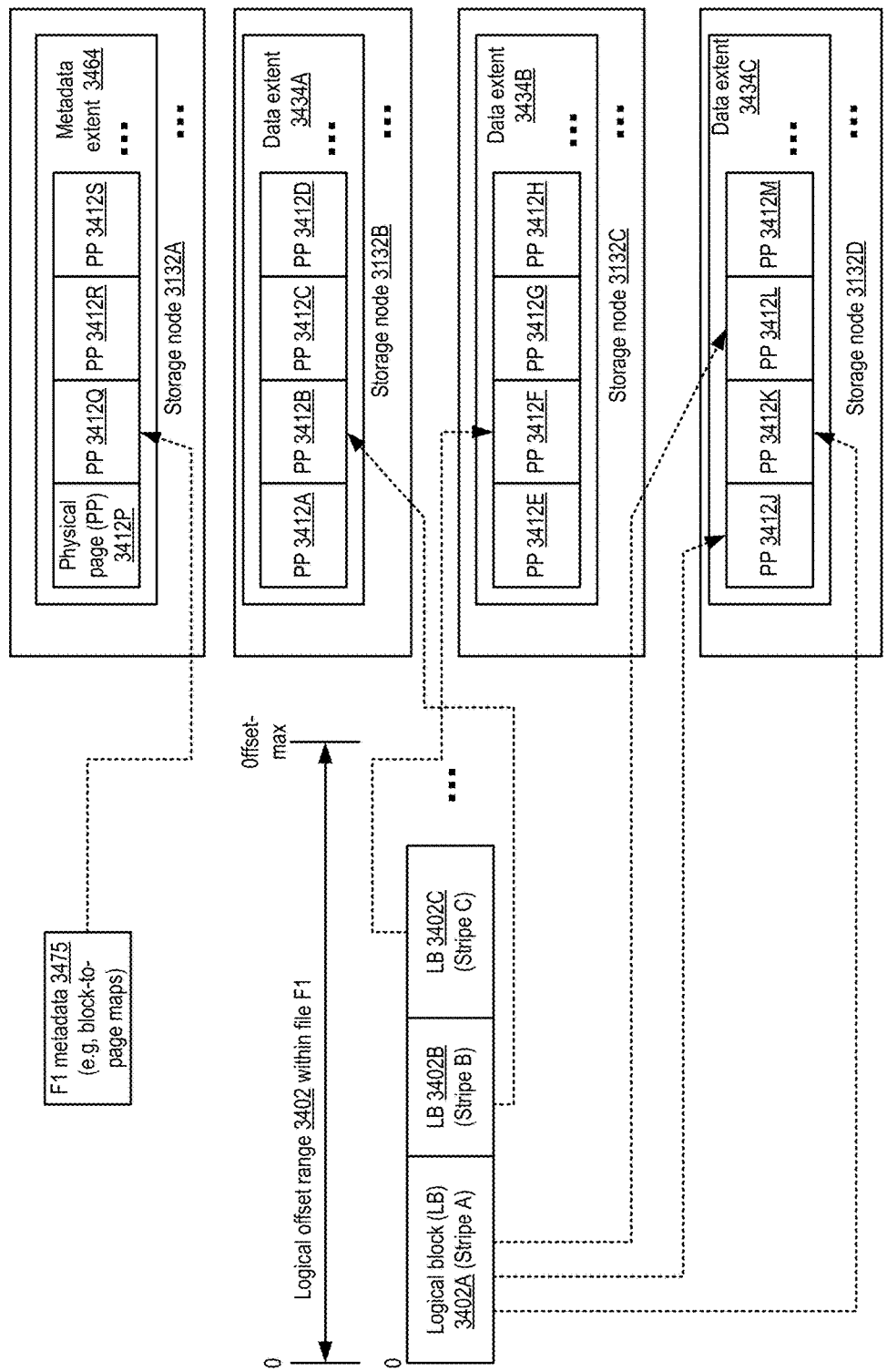
FIG. 12 illustrates a mapping between file storage service objects, logical blocks, and physical pages at one or more extents, according to some embodiments.

FIG. 12 illustrates a mapping between file storage service objects, logical blocks, and physical pages at one or more extents, according to some embodiments. Three logical blocks LB 3402A, 3402B and 3402C have been configured for a file F1. Logical blocks may also be referred to herein as stripes, as the content of different logical blocks of a given object such as file or metadata structure may typically be stored at distinct storage locations. In some embodiments, physical separation of stripes such as stripes A, B and C of file F1 may be enforced—e.g., no two stripes of a given object may be stored at the same physical storage device. In other embodiments, physical separation of stripes may occur with a high probability without explicit enforcement, e.g., due to the use of random or near-random distribution of stripes across large numbers of physical devices. In at least some embodiments, logical block sizes may vary within a given file or metadata structure. In other embodiments, all the logical blocks of at least some storage service objects may be of the same size. The content of each logical block 3402 may be stored in one or more physical pages (PPs) 3412 of a given data extent 3434 in the depicted embodiment. Thus, for example, content of LB 3402 have been written to PPs 3412J, 3412K and 3412L at data extent 3434C of storage node 3132D. Content of LB 3403 are stored in PP 3412B within data extent 3434A of storage node 3132B, and content of LB 3404 are stored in PP 3412F of storage extent 3434B at storage node 3132C. To simplify the discussion of the mapping between blocks and pages, extent replicas are not shown in FIG. 12. At least in the depicted embodiment, the techniques used for replication of extents may be independent of the techniques used for mapping blocks to pages.

In at least some embodiments, as described below in further detail, dynamic on-demand allocation may be used for physical storage, in accordance with which only the set of pages actually needed to store the write payload of a given write request may actually be allocated when the write request is received. Consider an example scenario in which the logical block size of a particular LB is 8 megabytes, a fixed page size of 64 kilobytes is being used for the extent to which the LB is mapped, and the first write directed to the LB includes a write payload of 56 kilobytes. In such a scenario, only one page (64 kilobytes) of storage space may be allocated in response to the request in embodiments in which on-demand allocation is being used. In other embodiments, physical storage for the entire LB may be set aside in response to the first write request directed to the LB, regardless of the write payload size.

When a client writes to a particular file for the first time, a selected metadata subsystem node may generate metadata 3475 for one or more logical blocks 3402 (e.g., depending on the size of the write payload relative to the logical block size, more than one logical block may be required in some cases). This metadata 3475 itself may be stored in one or more physical pages such as PP 3412Q of a metadata extent 3464 in the depicted embodiment. The block sizes and/or page sizes being used for metadata structures may differ from those being used for the corresponding data in at least some embodiments. In at least one embodiment, the metadata extents may be stored using a different class or type of storage device (e.g., SSDs) than are used for data (e.g., rotating disks). In some implementations, at least a portion of the metadata and at least a portion of metadata for the same file store object may be stored on the same extent.

In some embodiments, as discussed above, the content of data extents 3434 and/or metadata extents 3464 may be replicated, e.g., in order to meet respective data durability requirements. In such embodiments, as described in further detail below, a particular replica of a logical extent may be chosen as the master replica, and updates to the extent may be initiated and/or coordinated by the master replica (or the storage node where the master replica resides), e.g., by propagating the updates to the required number of replicas from the master before indicating that the corresponding update request has succeeded.

The order in which content of a given logical block is written at the storage device at which any given replica of the extent is stored may vary—i.e., if two 32-kilobyte physical pages P1 and P2 corresponding to a particular 1-megabyte logical block are located in the order "P1 followed by P2" on the disk or SSD, this may not necessarily imply that the data in P1 has a lower starting offset within the logical block than the data in P2. In some embodiments, pages may be moved (i.e., rearranged within their storage device) after they are first written, e.g., to facilitate improved sequential read or write performance. Within a given extent or extent replica, physical pages associated with several different files may be stored—for example, in metadata extent 634, block-to-page maps (or other metadata) of one or more files other than F1 may be stored in PPs 3412P, 3412R and 3412S. Similarly, pages 3412A, 3412C, 3412D, 3412E, 3412G, 3412H, and 3412M may all store content of files other than F1. In some embodiments, a large enough number of extents may be established that the probability of any two logical blocks of the same file being mapped to the same extent (e.g., to the same replica group of extents) may be quite low. In such a scenario, it may be possible to respond in parallel to concurrent I/O requests directed to different logical blocks of the same file, as the requests may be directed (in most cases) to different storage nodes and different storage devices. In at least one embodiment, the storage system may in general tend to distribute logical blocks in an apparently random or near-random manner among available extents, e.g., by selecting the extent to be used for a particular block based on factors such as the amount of available free space at the time that the particular block is first written.

Figure 13:
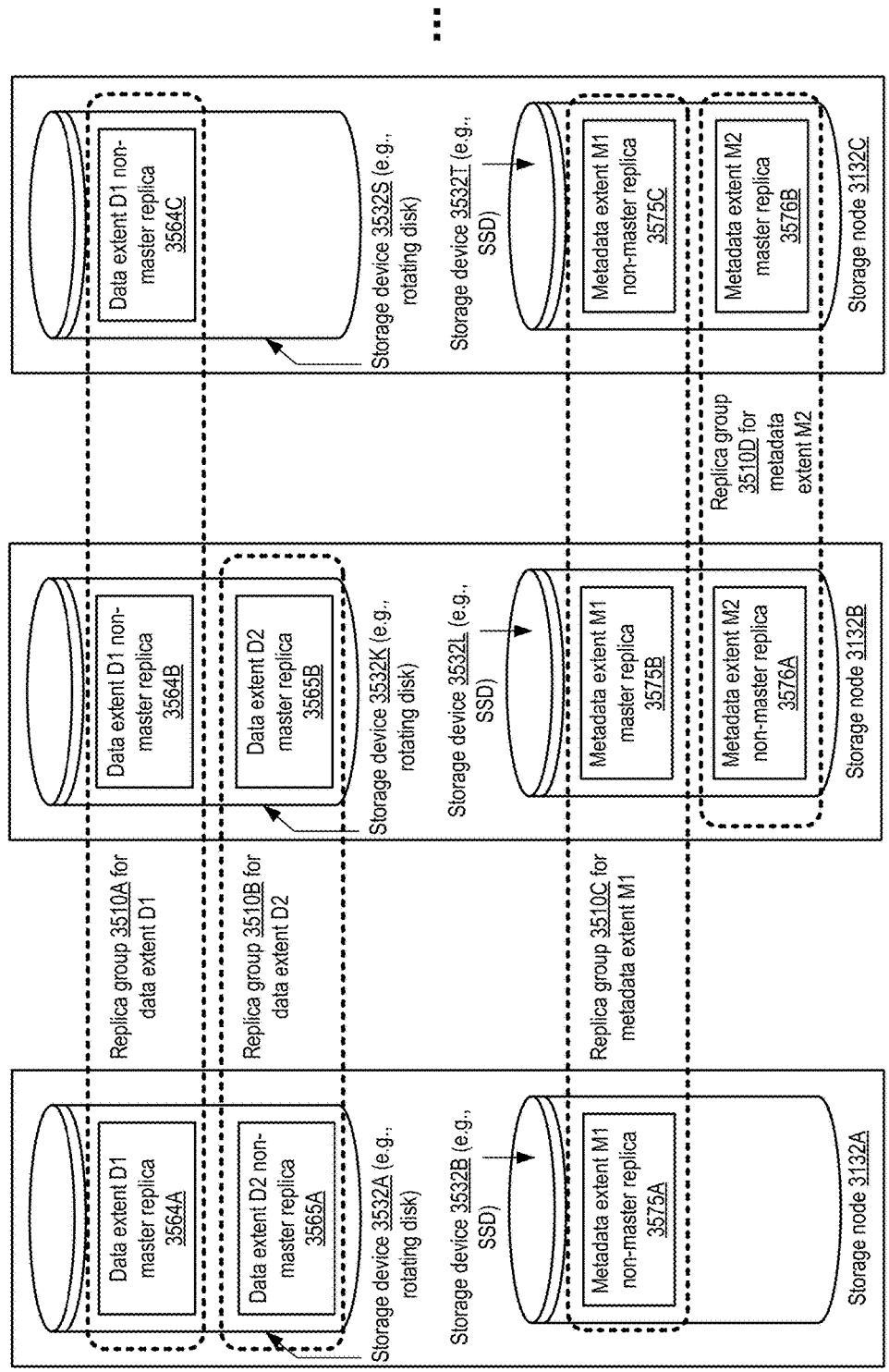
FIG. 13 illustrates a configuration of replica groups for data and metadata extents, according to some embodiments.

FIG. 13 illustrates a configuration of replica groups 3510 for data and metadata extents, according to some embodiments. Two replica groups 3510A and 3510B for data extents D1 and D2 are shown, and two replica groups 3510C and 3510D for metadata extents M1 and M2 are shown. Each replica group illustrated includes two or more replicas at respective storage devices 3532 at respective storage nodes 3132 of the storage subsystem, although in general it may sometimes be the case that two physical replicas of the same logical extent are stored on the same storage device or on different storage devices at the same storage node.

Each replica group 3510 is shown as including one master replica and one or more non-master replicas. The master replica may be responsible for coordinating writes to the members of the replica group, e.g., using a replicated state machine and/or a consensus-based update protocol. In some embodiments, a replicated state machine and/or a consensus-based protocol may also be used for reads as well. The total number of replicas in a replication group may vary as a function of the durability requirements for the file data and/or metadata being stored at the replicas. In FIG. 13, replica 3564A is the master replica of group 3510A, replica 3565B is the master replica of group 3510B, replica 3575B is the master replica of replica group 3510C, and replica 3576B is the master replica of replica group 3510D. Replica groups 3510A and 3510C include two non-master replicas each (replicas 3564B and 3564C for group 3510A, and replicas 3575A and 3575C for group 3510B). Different types of replication techniques may be used in various embodiments, such as erasure-coding techniques, full replication, or a combination of full and erasure-coded replicas. In some embodiments, different replication techniques may be used for different file stores.

In at least some embodiments, a variety of different storage devices may be available for storing extent replicas, such as one or more types of SSDs and/or individual or arrayed devices based on rotating magnetic disks. In some embodiments, a given storage node 3132 may include several different types of storage devices, while in other embodiments a given storage node may only have a single type of storage device available. In the depicted embodiment, storage nodes 3132A, 3132B and 3132C each have an SSD device (devices 3532B, 3532L and 3532T respectively at the three nodes) as well as a rotating disk-based device (3532A, 3532K and 3532S respectively). In some implementations, one particular storage device technology may be preferred, for storing data extent replicas, metadata extent replicas, or for storing both types of extents as long as space is available. In one implementation, for example, metadata extents may be stored on SSDs when possible, while data extents may be stored on cheaper rotating disks. In some embodiments, data and/or metadata extents, or portions thereof, may be migrated from one type of storage device to another, for example based on usage levels.

Example Provider Network Environment

This section describes example provider network environments in which embodiments of the methods and apparatus described in reference to FIGS. 1 through 13 may be implemented. However, these example provider network environments are not intended to be limiting.

Figure 14:
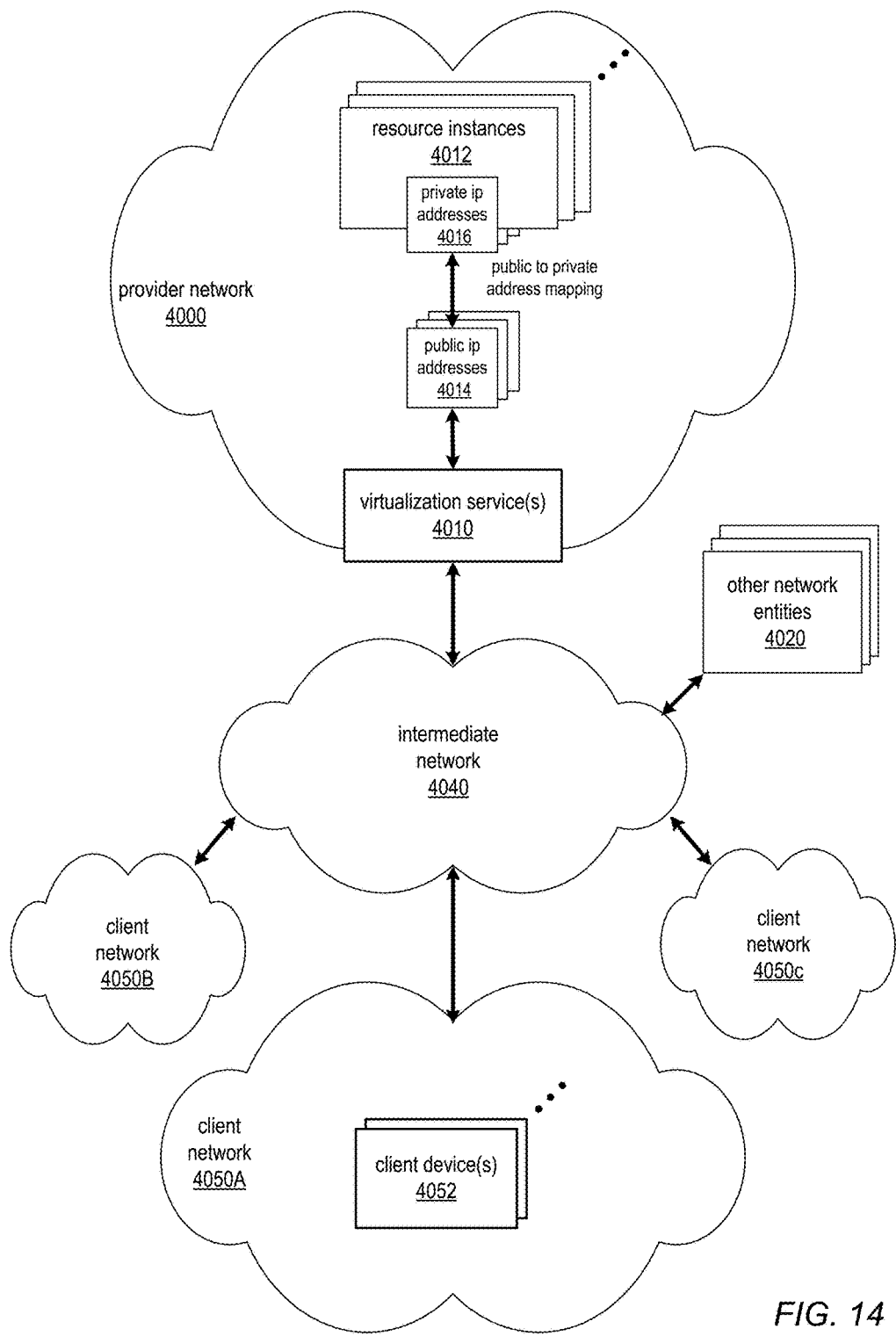
FIG. 14 illustrates an example provider network environment, according to some embodiments.

FIG. 14 illustrates an example provider network environment, according to some embodiments. A provider network 4000 may provide resource virtualization to clients via one or more virtualization services 4010 that allow clients to purchase, rent, or otherwise obtain instances 4012 of virtualized resources, including but not limited to computation and storage resources, implemented on devices within the provider network or networks in one or more data centers. Private IP addresses 4016 may be associated with the resource instances 4012; the private IP addresses are the internal network addresses of the resource instances 4012 on the provider network 4000. In some embodiments, the provider network 4000 may also provide public IP addresses 4014 and/or public IP address ranges (e.g., Internet Protocol version 4 (IPv4) or Internet Protocol version 6 (IPv6) addresses) that clients may obtain from the provider 4000.

Conventionally, the provider network 4000, via the virtualization services 4010, may allow a client of the service provider (e.g., a client that operates client network 4050A) to dynamically associate at least some public IP addresses 4014 assigned or allocated to the client with particular resource instances 4012 assigned to the client. The provider network 4000 may also allow the client to remap a public IP address 4014, previously mapped to one virtualized computing resource instance 4012 allocated to the client, to another virtualized computing resource instance 4012 that is also allocated to the client. Using the virtualized computing resource instances 4012 and public IP addresses 4014 provided by the service provider, a client of the service provider such as the operator of client network 4050A may, for example, implement client-specific applications and present the client's applications on an intermediate network 4040, such as the Internet. Other network entities 4020 on the intermediate network 4040 may then generate traffic to a destination public IP address 4014 published by the client network 4050A; the traffic is routed to the service provider data center, and at the data center is routed, via a network substrate, to the private IP address 4016 of the virtualized computing resource instance 4012 currently mapped to the destination public IP address 4014. Similarly, response traffic from the virtualized computing resource instance 4012 may be routed via the network substrate back onto the intermediate network 4040 to the source entity 4020.

Private IP addresses, as used herein, refer to the internal network addresses of resource instances in a provider network. Private IP addresses are only routable within the provider network. Network traffic originating outside the provider network is not directly routed to private IP addresses; instead, the traffic uses public IP addresses that are mapped to the resource instances. The provider network may include network devices or appliances that provide network address translation (NAT) or similar functionality to perform the mapping from public IP addresses to private IP addresses and vice versa.

Public IP addresses, as used herein, are Internet routable network addresses that are assigned to resource instances, either by the service provider or by the client. Traffic routed to a public IP address is translated, for example via 1:1 network address translation (NAT), and forwarded to the respective private IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a private IP address of a resource instance is the default launch configuration for all resource instance types.

At least some public IP addresses may be allocated to or obtained by clients of the provider network 4000; a client may then assign their allocated public IP addresses to particular resource instances allocated to the client. These public IP addresses may be referred to as client public IP addresses, or simply client IP addresses. Instead of being assigned by the provider network 4000 to resource instances as in the case of standard IP addresses, client IP addresses may be assigned to resource instances by the clients, for example via an API provided by the service provider. Unlike standard IP addresses, client IP Addresses are allocated to client accounts and can be remapped to other resource instances by the respective clients as necessary or desired. A client IP address is associated with a client's account, not a particular resource instance, and the client controls that IP address until the client chooses to release it. Unlike conventional static IP addresses, client IP addresses allow the client to mask resource instance or availability zone failures by remapping the client's public IP addresses to any resource instance associated with the client's account. The client IP addresses, for example, enable a client to engineer around problems with the client's resource instances or software by remapping client IP addresses to replacement resource instances.

Figure 15:
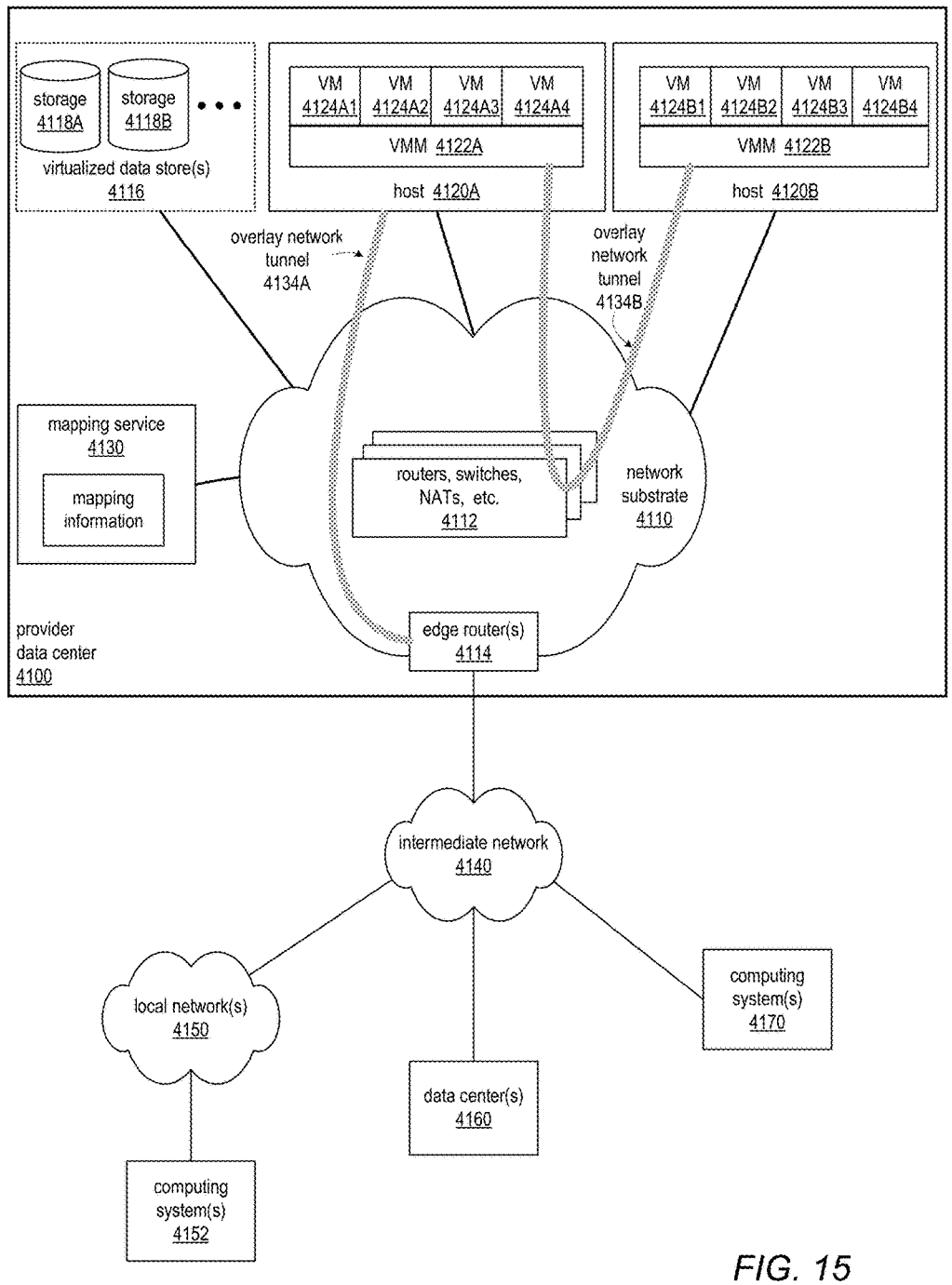
FIG. 15 illustrates an example data center that implements an overlay network on a network substrate using IP tunneling technology, according to some embodiments.

FIG. 15 illustrates an example data center that implements an overlay network on a network substrate using IP tunneling technology, according to some embodiments. A provider data center 4100 may include a network substrate that includes networking devices 4112 such as routers, switches, network address translators (NATs), and so on. Some embodiments may employ an Internet Protocol (IP) tunneling technology to provide an overlay network via which encapsulated packets may be passed through network substrate 4110 using tunnels. The IP tunneling technology may provide a mapping and encapsulating system for creating an overlay network on a network (e.g., a local network in data center 4100 of FIG. 15) and may provide a separate namespace for the overlay layer (the public IP addresses) and the network substrate 4110 layer (the private IP addresses). Packets in the overlay layer may be checked against a mapping directory (e.g., provided by mapping service 4130) to determine what their tunnel substrate target (private IP address) should be. The IP tunneling technology provides a virtual network topology (the overlay network); the interfaces (e.g., service APIs) that are presented to clients are attached to the overlay network so that when a client provides an IP address to which the client wants to send packets, the IP address is run in virtual space by communicating with a mapping service (e.g., mapping service 4130) that knows where the IP overlay addresses are.

In some embodiments, the IP tunneling technology may map IP overlay addresses (public IP addresses) to substrate IP addresses (private IP addresses), encapsulate the packets in a tunnel between the two namespaces, and deliver the packet to the correct endpoint via the tunnel, where the encapsulation is stripped from the packet. In FIG. 15, an example overlay network tunnel 4134A from a virtual machine (VM) 4124A on host 4120A to a device on the intermediate network 4150 and an example overlay network tunnel 4134B between a VM 4124B on host 4120B and a VM 4124C on host 4120C are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (private IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the private IP addresses.

Referring to FIG. 15, at least some networks in which embodiments may be implemented may include hardware virtualization technology that enables multiple operating systems to run concurrently on a host computer (e.g., hosts 4120A and 4120B of FIG. 15), i.e. as virtual machines (VMs) 4124 on the hosts 4120. The VMs 4124 may, for example, be rented or leased to clients of a network provider. A hypervisor, or virtual machine monitor (VMM) 4122, on a host 4120 presents the VMs 4124 on the host with a virtual platform and monitors the execution of the VMs 4124. Each VM 4124 may be provided with one or more private IP addresses; the VMM 4122 on a host 4120 may be aware of the private IP addresses of the VMs 4124 on the host. A mapping service 4130 may be aware of all network IP prefixes and the IP addresses of routers or other devices serving IP addresses on the local network. This includes the IP addresses of the VMMs 4122 serving multiple VMs 4124. The mapping service 4130 may be centralized, for example on a server system, or alternatively may be distributed among two or more server systems or other devices on the network. A network may, for example, use the mapping service technology and IP tunneling technology to, for example, route data packets between VMs 4124 on different hosts 4120 within the data center 4100 network; note that an interior gateway protocol (IGP) may be used to exchange routing information within such a local network.

In addition, a network such as the provider data center 4100 network (which is sometimes referred to as an autonomous system (AS)) may use the mapping service technology, IP tunneling technology, and routing service technology to route packets from the VMs 4124 to Internet destinations, and from Internet sources to the VMs 4124. Note that an external gateway protocol (EGP) or border gateway protocol (BGP) is typically used for Internet routing between sources and destinations on the Internet. FIG. 15 shows an example provider data center 4100 implementing a network that provides resource virtualization technology and that provides full Internet access via edge router(s) 4114 that connect to Internet transit providers, according to some embodiments. The provider data center 4100 may, for example, provide clients the ability to implement virtual computing systems (VMs 4124) via a hardware virtualization service and the ability to implement virtualized data stores 4116 on storage resources 4118 via a storage virtualization service.

The data center 4100 network may implement IP tunneling technology, mapping service technology, and a routing service technology to route traffic to and from virtualized resources, for example to route packets from the VMs 4124 on hosts 4120 in data center 4100 to Internet destinations, and from Internet sources to the VMs 4124. Internet sources and destinations may, for example, include computing systems 4170 connected to the intermediate network 4140 and computing systems 4152 connected to local networks 4150 that connect to the intermediate network 4140 (e.g., via edge router(s) 4114 that connect the network 4150 to Internet transit providers). The provider data center 4100 network may also route packets between resources in data center 4100, for example from a VM 4124 on a host 4120 in data center 4100 to other VMs 4124 on the same host or on other hosts 4120 in data center 4100.

A service provider that provides data center 4100 may also provide additional data center(s) 4160 that include hardware virtualization technology similar to data center 4100 and that may also be connected to intermediate network 4140. Packets may be forwarded from data center 4100 to other data centers 4160, for example from a VM 4124 on a host 4120 in data center 4100 to another VM on another host in another, similar data center 4160, and vice versa.

While the above describes hardware virtualization technology that enables multiple operating systems to run concurrently on host computers as virtual machines (VMs) on the hosts, where the VMs may be rented or leased to clients of the network provider, the hardware virtualization technology may also be used to provide other computing resources, for example storage resources 4118, as virtualized resources to clients of a network provider in a similar manner.

Figure 16:
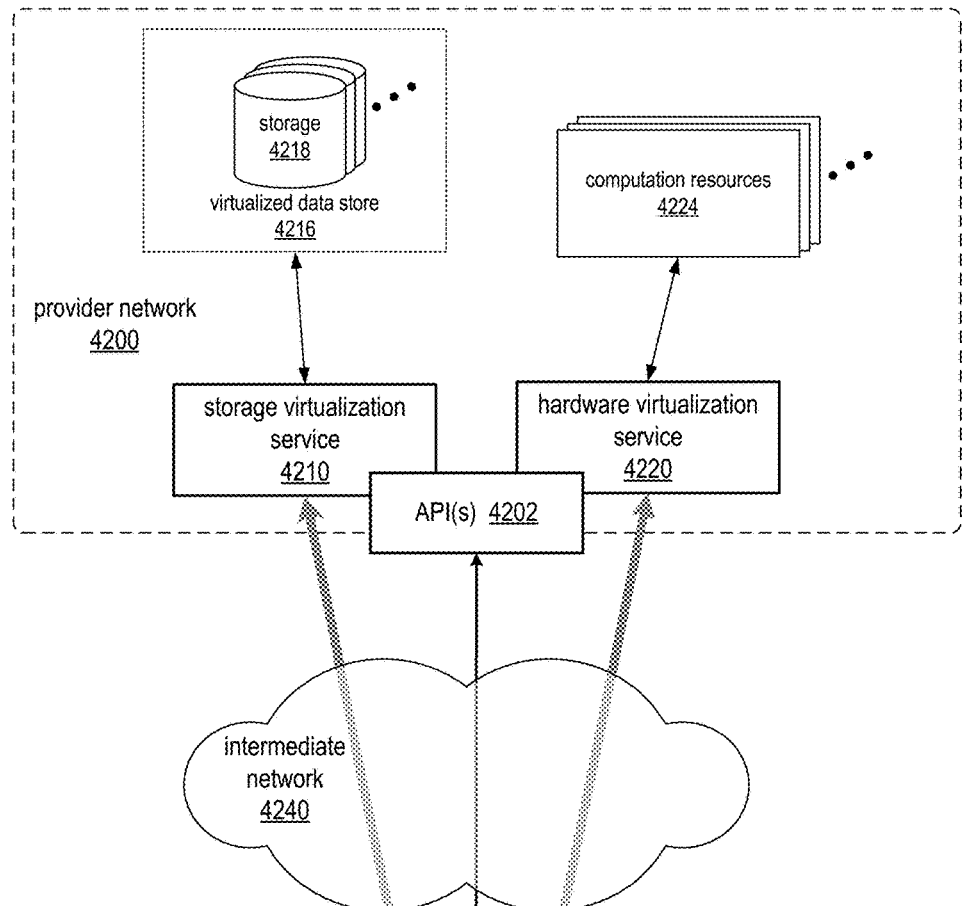
FIG. 16 is a block diagram of an example provider network that provides a storage virtualization service and a hardware virtualization service to clients, according to some embodiments.
Figure 16:
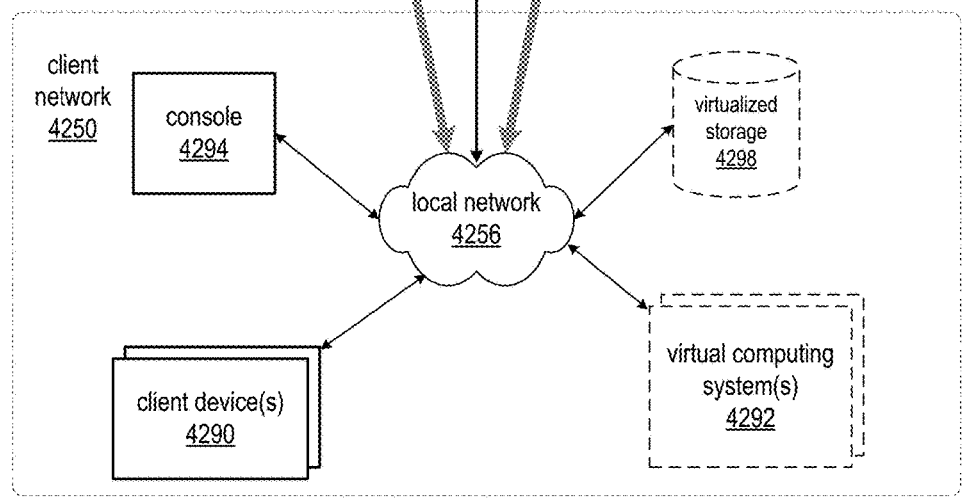

FIG. 16 is a block diagram of an example provider network that provides a storage virtualization service and a hardware virtualization service to clients, according to some embodiments. Hardware virtualization service 4220 provides multiple computation resources 4224 (e.g., VMs) to clients. The computation resources 4224 may, for example, be rented or leased to clients of the provider network 4200 (e.g., to a client that implements client network 4250). Each computation resource 4224 may be provided with one or more private IP addresses. Provider network 4200 may be configured to route packets from the private IP addresses of the computation resources 4224 to public Internet destinations, and from public Internet sources to the computation resources 4224.

Provider network 4200 may provide a client network 4250, for example coupled to intermediate network 4240 via local network 4256, the ability to implement virtual computing systems 4292 via hardware virtualization service 4220 coupled to intermediate network 4240 and to provider network 4200. In some embodiments, hardware virtualization service 4220 may provide one or more APIs 4202, for example a web services interface, via which a client network 4250 may access functionality provided by the hardware virtualization service 4220, for example via a console 4294. In some embodiments, at the provider network 4200, each virtual computing system 4292 at client network 4250 may correspond to a computation resource 4224 that is leased, rented, or otherwise provided to client network 4250.

From an instance of a virtual computing system 4292 and/or another client device 4290 or console 4294, the client may access the functionality of storage virtualization service 4210, for example via one or more APIs 4202, to access data from and store data to a virtual data store 4216 provided by the provider network 4200. In some embodiments, a virtualized data store gateway (not shown) may be provided at the client network 4250 that may locally cache at least some data, for example frequently accessed or critical data, and that may communicate with virtualized data store service 4210 via one or more communications channels to upload new or modified data from a local cache so that the primary store of data (virtualized data store 4216) is maintained. In some embodiments, a user, via a virtual computing system 4292 and/or on another client device 4290, may mount and access virtual data store 4216 volumes, which appear to the user as local virtualized storage 4298.

While not shown in FIG. 16, the virtualization service(s) may also be accessed from resource instances within the provider network 4200 via API(s) 4202. For example, a client, appliance service provider, or other entity may access a virtualization service from within a respective private network on the provider network 4200 via an API 4202 to request allocation of one or more resource instances within the private network or within another private network.

Figure 17:
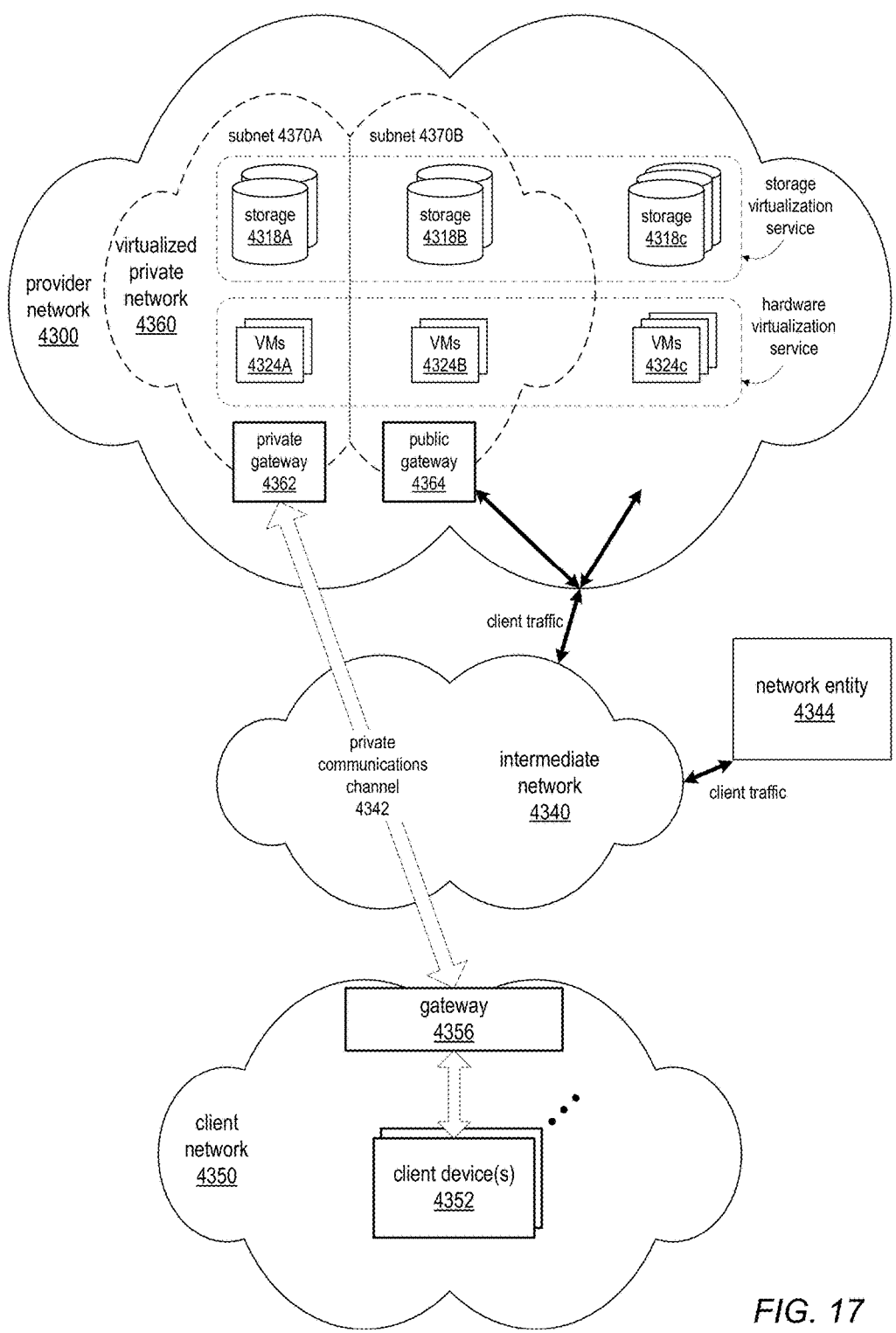
FIG. 17 illustrates an example provider network that provides virtualized private networks to at least some clients, according to some embodiments.

FIG. 17 illustrates an example provider network that provides private networks on the provider network to at least some clients, according to some embodiments. A client's virtualized private network 4360 on a provider network 4300, for example, enables a client to connect their existing infrastructure (e.g., devices 4352) on client network 4350 to a set of logically isolated resource instances (e.g., VMs 4324A and 4324B and storage 4318A and 4318B), and to extend management capabilities such as security services, firewalls, and intrusion detection systems to include their resource instances.

A client's virtualized private network 4360 may be connected to a client network 4350 via a private communications channel 4342. A private communications channel 4342 may, for example, be a tunnel implemented according to a network tunneling technology or some other technology over an intermediate network 4340. The intermediate network may, for example, be a shared network or a public network such as the Internet. Alternatively, a private communications channel 4342 may be implemented over a direct, dedicated connection between virtualized private network 4360 and client network 4350.

A public network may be broadly defined as a network that provides open access to and interconnectivity among a plurality of entities. The Internet, or World Wide Web (WWW) is an example of a public network. A shared network may be broadly defined as a network to which access is limited to two or more entities, in contrast to a public network to which access is not generally limited. A shared network may, for example, include one or more local area networks (LANs) and/or data center networks, or two or more LANs or data center networks that are interconnected to form a wide area network (WAN). Examples of shared networks may include, but are not limited to, corporate networks and other enterprise networks. A shared network may be anywhere in scope from a network that covers a local area to a global network. Note that a shared network may share at least some network infrastructure with a public network, and that a shared network may be coupled to one or more other networks, which may include a public network, with controlled access between the other network(s) and the shared network. A shared network may also be viewed as a private network, in contrast to a public network such as the Internet. In some embodiments, either a shared network or a public network may serve as an intermediate network between a provider network and a client network.

To establish a virtualized private network 4360 for a client on provider network 4300, one or more resource instances (e.g., VMs 4324A and 4324B and storage 4318A and 4318B) may be allocated to the virtualized private network 4360. Note that other resource instances (e.g., storage 4318C and VMs 4324C) may remain available on the provider network 4300 for other client usage. A range of public IP addresses may also be allocated to the virtualized private network 4360. In addition, one or more networking devices (routers, switches, etc.) of the provider network 4300 may be allocated to the virtualized private network 4360. A private communications channel 4342 may be established between a private gateway 4362 at virtualized private network 4360 and a gateway 4356 at client network 4350.

In some embodiments, in addition to, or instead of, a private gateway 4362, virtualized private network 4360 may include a public gateway 4364 that enables resources within virtualized private network 4360 to communicate directly with entities (e.g., network entity 4344) via intermediate network 4340, and vice versa, instead of or in addition to via private communications channel 4342.

Virtualized private network 4360 may be, but is not necessarily, subdivided into two or more subnetworks, or subnets, 4370. For example, in implementations that include both a private gateway 4362 and a public gateway 4364, the private network may be subdivided into a subnet 4370A that includes resources (VMs 4324A and storage 4318A, in this example) reachable through private gateway 4362, and a subnet 4370B that includes resources (VMs 4324B and storage 4318B, in this example) reachable through public gateway 4364.

The client may assign particular client public IP addresses to particular resource instances in virtualized private network 4360. A network entity 4344 on intermediate network 4340 may then send traffic to a public IP address published by the client; the traffic is routed, by the provider network 4300, to the associated resource instance. Return traffic from the resource instance is routed, by the provider network 4300, back to the network entity 4344 over intermediate network 4340. Note that routing traffic between a resource instance and a network entity 4344 may require network address translation to translate between the public IP address and the private IP address of the resource instance.

Some embodiments may allow a client to remap public IP addresses in a client's virtualized private network 4360 as illustrated in FIG. 17 to devices on the client's external network 4350. When a packet is received (e.g., from network entity 4344), the network 4300 may determine that the destination IP address indicated by the packet has been remapped to an endpoint on external network 4350 and handle routing of the packet to the respective endpoint, either via private communications channel 4342 or via the intermediate network 4340. Response traffic may be routed from the endpoint to the network entity 4344 through the provider network 4300, or alternatively may be directly routed to the network entity 4344 by the client network 4350. From the perspective of the network entity 4344, it appears as if the network entity 4344 is communicating with the public IP address of the client on the provider network 4300. However, the network entity 4344 has actually communicated with the endpoint on client network 4350.

While FIG. 17 shows network entity 4344 on intermediate network 4340 and external to provider network 4300, a network entity may be an entity on provider network 4300. For example, one of the resource instances provided by provider network 4300 may be a network entity that sends traffic to a public IP address published by the client.

Illustrative System

Figure 18:
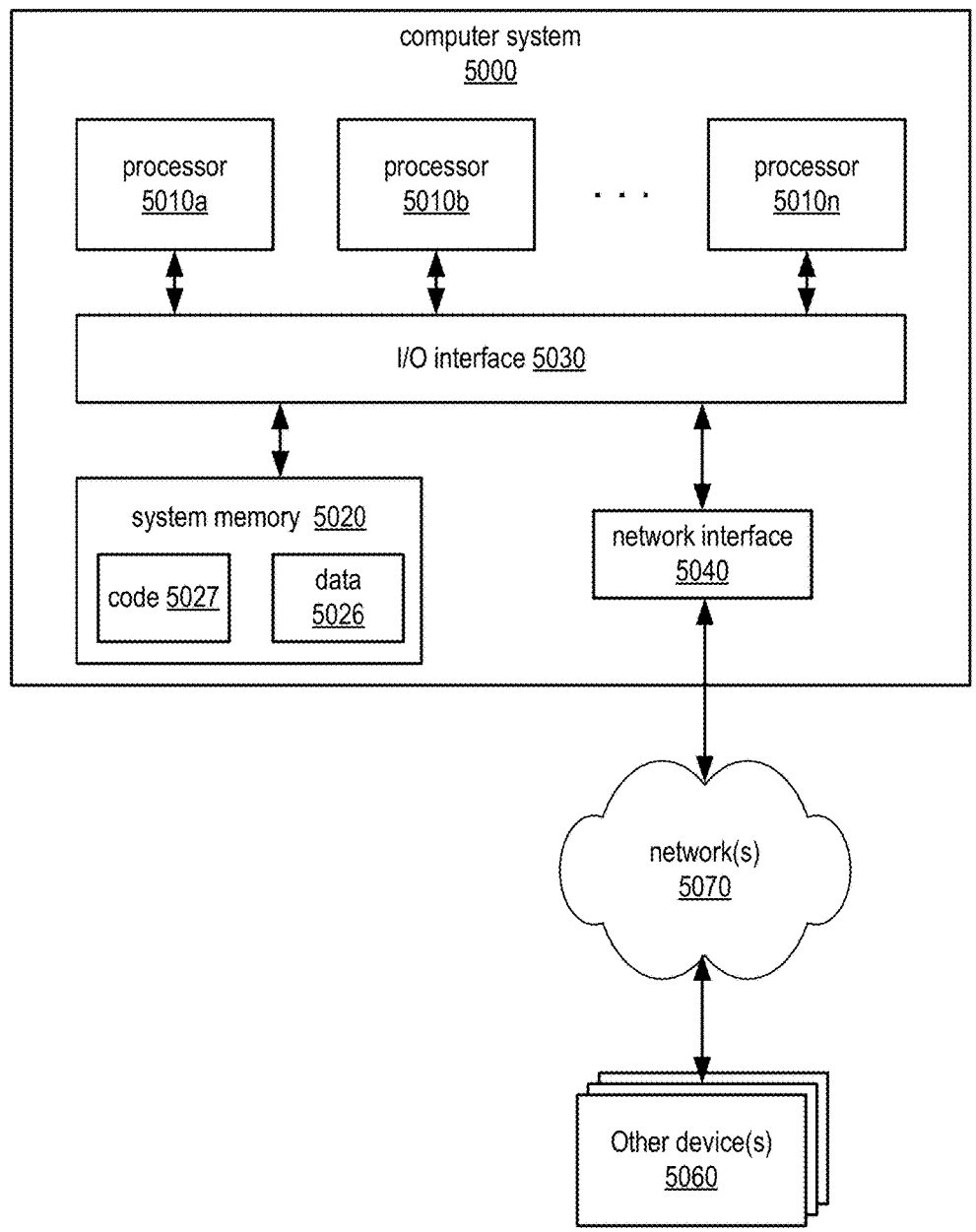
FIG. 18 is a block diagram illustrating an example computer system that may be used in some embodiments.

In some embodiments, a system that implements a portion or all of the methods and apparatus for post data synchronization in migration of domains in network environments as described herein may include a general-purpose computer system that includes or is configured to access one or more computer-accessible media, such as computer system 5000 illustrated in FIG. 18. In the illustrated embodiment, computer system 5000 includes one or more processors 5010 coupled to a system memory 5020 via an input/output (I/O) interface 5030. Computer system 5000 further includes a network interface 5040 coupled to I/O interface 5030.

In various embodiments, computer system 5000 may be a uniprocessor system including one processor 5010, or a multiprocessor system including several processors 5010 (e.g., two, four, eight, or another suitable number). Processors 5010 may be any suitable processors capable of executing instructions. For example, in various embodiments, processors 5010 may be general-purpose or embedded processors implementing any of a variety of instruction set architectures (ISAs), such as the x86, PowerPC, SPARC, or MIPS ISAs, or any other suitable ISA. In multiprocessor systems, each of processors 5010 may commonly, but not necessarily, implement the same ISA.

System memory 5020 may be configured to store instructions and data accessible by processor(s) 5010. In various embodiments, system memory 5020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for providing client-defined rules for clients' resources in provider network environments, are shown stored within system memory 5020 as code 5025 and data 5026.

In one embodiment, I/O interface 5030 may be configured to coordinate I/O traffic between processor 5010, system memory 5020, and any peripheral devices in the device, including network interface 5040 or other peripheral interfaces. In some embodiments, I/O interface 5030 may perform any necessary protocol, timing or other data transformations to convert data signals from one component (e.g., system memory 5020) into a format suitable for use by another component (e.g., processor 5010). In some embodiments, I/O interface 5030 may include support for devices attached through various types of peripheral buses, such as a variant of the Peripheral Component Interconnect (PCI) bus standard or the Universal Serial Bus (USB) standard, for example. In some embodiments, the function of I/O interface 5030 may be split into two or more separate components, such as a north bridge and a south bridge, for example. Also, in some embodiments some or all of the functionality of I/O interface 5030, such as an interface to system memory 5020, may be incorporated directly into processor 5010.

Network interface 5040 may be configured to allow data to be exchanged between computer system 5000 and other devices 5060 attached to a network or networks 5050, such as other computer systems or devices as illustrated in FIGS. 1 through 17, for example. In various embodiments, network interface 5040 may support communication via any suitable wired or wireless general data networks, such as types of Ethernet network, for example. Additionally, network interface 5040 may support communication via telecommunications/telephony networks such as analog voice networks or digital fiber communications networks, via storage area networks such as Fibre Channel SANs, or via any other suitable type of network and/or protocol.

In some embodiments, system memory 5020 may be one embodiment of a computer-accessible medium configured to store program instructions and data as described above for FIGS. 1 through 10 for implementing embodiments of methods and apparatus for post data synchronization in migration of domains in provider network environments. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 5000 via I/O interface 5030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 5000 as system memory 5020 or another type of memory. Further, a computer-accessible medium may include transmission media or signals such as electrical, electromagnetic, or digital signals, conveyed via a communication medium such as a network and/or a wireless link, such as may be implemented via network interface 5040.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A distributed storage service, comprising:
   a plurality of computing devices that implement:
      a storage subsystem comprising a plurality of storage nodes configured to store data for a plurality of data systems;
      an access subsystem comprising a plurality of access nodes, wherein two or more of the access nodes are assigned to a particular data system of the plurality of data systems and configured to:
         receive data requests for the data system; and
         issue write operations to the storage subsystem to update data of the data system as indicated by the data requests, wherein each write operation indicates a current snapshot epoch of the data system; and
      a snapshot coordinator implemented by one or more of the plurality of computing devices and configured to:
         obtain a snapshot request for the data system to generate a new snapshot; and
         perform a two-phase commit with the two or more access nodes assigned to the data system to establish a consistent snapshot point for the data system;
      wherein, to perform the two-phase commit, the snapshot coordinator is configured to:
         send a prepare message to each of the two or more access nodes, wherein the prepare message directs the access nodes to prepare to perform a snapshot epoch transition for the data system, wherein the snapshot epoch transition comprises incrementing the snapshot epoch at each of the two or more access nodes to thus establish a consistent snapshot point for the data system; and
         upon receiving a response message to the prepare message from each of the two or more access nodes, send a commit message to each of the two or more access nodes, wherein the commit message directs the access nodes to commit to the snapshot epoch transition so that subsequent write operations issued by the access nodes to the storage subsystem indicate a new snapshot epoch.

2. The distributed storage service as recited in claim 1, wherein each of the two or more access nodes is configured to, in response to receiving the prepare message from the snapshot coordinator:

stop issuing write operations for the data system to the storage subsystem;
wait for one or more pending write operations for the data system to the storage subsystem to complete;
send a response message to the prepare message to the snapshot coordinator;
start a presumed commit timer and wait for a commit message from the snapshot coordinator; and
in response to receiving a commit message from the snapshot coordinator or to presumed commit timer expiring:
increment the snapshot epoch; and
resume issuing write operations for the data system to the storage subsystem, wherein each subsequent write operation indicates the new snapshot epoch of the data system.

3. The distributed storage service as recited in claim 2, wherein each subsequent write operation further indicates to the storage subsystem to perform copy-on-write operations for the data indicated by the write operation, wherein a copy-on-write operation stores previous snapshot epoch data to a storage location to preserve the previous snapshot epoch data when writing the new snapshot epoch data to the data system.

4. The distributed storage service as recited in claim 1, wherein the snapshot coordinator is further configured to, after receiving a response message to the prepare message from each of the two or more access nodes, initiate generation of the snapshot of the data system for a previous snapshot epoch, wherein the snapshot includes results of write operations to the data system as of the previous snapshot epoch and does not include results of the write operations of the new snapshot epoch.

5. The distributed storage service as recited in claim 4, wherein the snapshot coordinator is further configured to restart the two-phase commit with the two or more access nodes assigned to the data system in response to determining that the generation of the snapshot of the data system for the previous snapshot epoch has failed.

6. The distributed storage service as recited in claim 1, wherein the data system is a file system, wherein the data of the file system includes file system data and file system metadata, and wherein the write operations include write operations to update file system data and write operations to update file system metadata.

7. The distributed storage service as recited in claim 1, wherein the snapshot coordinator is further configured to restart the two-phase commit with the two or more access nodes assigned to the data system in response to determining that the two-phase commit has failed.

8. A method, comprising:
performing, by a snapshot coordinator for a distributed storage service implemented by one or more computer systems:
providing a plurality of access nodes of the distributed storage service, wherein the access nodes are assigned to a data system stored by a storage subsystem of the distributed storage service, the access nodes configured to perform:
receiving data requests for the data system; and
issuing write operations to the storage subsystem to update data of the data system as indicated by the data requests, wherein each write operation indicates a current snapshot epoch of the data system;
in response to a snapshot request to generate a snapshot of the data system, performing a two-phase commit with a plurality of access nodes of the distributed storage service to establish a consistent snapshot point for the data system, wherein performing the two-phase commit comprises:
sending a prepare message to each of the plurality of access nodes, wherein the prepare message directs the access nodes to prepare to perform a snapshot epoch transition for the data system, wherein performing a snapshot epoch transition comprises incrementing a snapshot epoch at each of the plurality of access nodes to thus establish a consistent snapshot point for the data system;
when a response message to the prepare message is received from each of the access nodes, sending a commit message to each of the plurality of access nodes, wherein the commit message directs the access nodes to commit to the snapshot epoch transition so that subsequent write operations issued by the access nodes to the storage subsystem indicate a new snapshot epoch; and
when a response message to the prepare message is not received from each of the access nodes, sending a prepare message to each of the plurality of access nodes to retry the two-phase commit.

9. The method as recited in claim 8, wherein the snapshot coordinator waits for a designated time period to receive the response messages from the access nodes and, if a response message to the prepare message is not received from each of the access nodes within the designated time period, sends the prepare message to each of the plurality of access nodes to retry the two-phase commit.

10. The method as recited in claim 8, wherein the plurality of access nodes are configured to perform:
stopping the issuing of write operations for the data system to the storage subsystem after receiving the prepare message;
continuing to issue read request for the data system to the storage subsystem after receiving the prepare message; and
resuming the issuing of write operations after receiving the commit message.

11. The method as recited in claim 10, further comprising the storage system updating the data of the data system as indicated by the write operations, wherein each element of data that is updated is tagged with the current snapshot epoch.

12. The method as recited in claim 10, further comprising performing, by at least one of the plurality of access nodes in response to receiving the prepare message from the snapshot coordinator:
stopping the issuing of write operations for the data system to the storage subsystem;
upon completion of pending write operations for the data system to the storage system, sending a response message to the prepare message to the snapshot coordinator;
starting a presumed commit timer and waiting for a commit message from the snapshot coordinator; and
in response to receiving a commit message from the snapshot coordinator or to presumed commit timer expiring:
incrementing the snapshot epoch; and
resuming the issuing of write operations for the data system to the storage subsystem, wherein each subsequent write operation indicates the new snapshot epoch of the data system.

13. The method as recited in claim 12, wherein each subsequent write operation further indicates to the storage subsystem to perform copy-on-write operations for the data indicated by the write operation, wherein a copy-on-write operation stores previous snapshot epoch data to a storage location to preserve the previous snapshot epoch data when writing the new snapshot epoch data to the data system.

14. The method as recited in claim 10, wherein the data system is a file system, wherein the data of the file system includes file system data and file system metadata, and wherein the write operations include write operations to update file system data and write operations to update file system metadata.

15. The method as recited in claim 14, wherein the distributed storage service further comprises a metadata subsystem comprising a plurality of metadata servers, wherein the method further comprises:
  the plurality of access nodes sending the write operations to update file system metadata to the metadata servers; and
  the metadata services issuing the write operations to update file system metadata to the storage subsystem.

16. The method as recited in claim 8, further comprising the snapshot coordinator, after receiving a response message to the prepare message from each of the access nodes, initiating generation of the snapshot of the data system for a previous snapshot epoch, wherein the snapshot includes results of write operations to the data system as of the previous snapshot epoch and does not include results of the write operations of the new snapshot epoch.

17. The method as recited in claim 16, further comprising the snapshot coordinator restarting the two-phase commit with the plurality of access nodes of the distributed storage service to establish a consistent snapshot point for the data system in response to determining that the generation of the snapshot of the data system for the previous snapshot epoch has failed.

18. A non-transitory computer-readable storage medium storing program instructions that when executed on one or more computers cause the one or more computers to implement:
  a plurality of access nodes in a distributed storage service configured to:
    receive data requests for a data system stored by a storage subsystem of the distributed storage service; and
    issue write operations to the storage subsystem to update data of the data system as indicated by the data requests, wherein each write operation indicates a current snapshot epoch of the data system; and
  a snapshot coordinator for the distributed storage service configured to, in response to a snapshot request to generate a snapshot of the data system, perform a two-phase commit with the access nodes to establish a consistent snapshot point for the data system, wherein, to perform the two-phase commit, the snapshot coordinator is configured to:
    send a prepare message to each of the access nodes, wherein the prepare message directs the access nodes to prepare to perform a snapshot epoch transition for the data system, wherein the snapshot epoch transition comprises incrementing the snapshot epoch at each of the access nodes to thus establish a consistent snapshot point for the data system; and
    upon receiving a response message to the prepare message from each of the access nodes, send a commit message to each of the access nodes, wherein the commit message directs the access nodes to commit to the snapshot epoch transition so that subsequent write operations issued by the access nodes to the storage subsystem indicate a new snapshot epoch.

19. The non-transitory computer-readable storage medium as recited in claim 18, wherein each of the access nodes is configured to, in response to receiving the prepare message from the snapshot coordinator:
  stop issuing write operations for the data system to the storage subsystem;
  wait for one or more pending write operations for the data system to the storage subsystem to complete;
  send a response message to the prepare message to the snapshot coordinator;
  start a presumed commit timer and wait for a commit message from the snapshot coordinator; and
  in response to receiving a commit message from the snapshot coordinator or to presumed commit timer expiring:
    increment the snapshot epoch; and
    resume issuing write operations for the data system to the storage subsystem, wherein each subsequent write operation indicates the new snapshot epoch of the data system;
  wherein each subsequent write operation further indicates to the storage subsystem to perform copy-on-write operations for the data indicated by the write operation, wherein a copy-on-write operation stores previous snapshot epoch data to a storage location to preserve the previous snapshot epoch data when writing the new snapshot epoch data to the data system.

20. The non-transitory computer-readable storage medium as recited in claim 18, wherein the snapshot coordinator is further configured to, after receiving a response message to the prepare message from each of the access nodes, initiate generation of the snapshot of the data system for a previous snapshot epoch, wherein the snapshot includes results of all write operations to the data system as of the previous snapshot epoch and does not include results of the write operations of the new snapshot epoch.

* * * * *